(12) United States Patent
Christensen et al.

(10) Patent No.: US 8,185,592 B2
(45) Date of Patent: May 22, 2012

(54) METHOD AND PROGRAM PRODUCT FOR PREVENTING DISTRIBUTION OF AN E-MAIL MESSAGE

(75) Inventors: Eric S. Christensen, Bethesda, MD (US); Christopher J. Dawson, Arlington, VA (US); Barry M. Graham, Silver Spring, MD (US)

(73) Assignee: International Business Machines Corporation, Armonk, NY (US)

( * ) Notice: Subject to any disclaimer, the term of this patent is extended or adjusted under 35 U.S.C. 154(b) by 266 days.

(21) Appl. No.: 11/749,798

(22) Filed: May 17, 2007

(65) Prior Publication Data
US 2008/0288597 A1   Nov. 20, 2008

(51) Int. Cl.
*G06F 15/16* (2006.01)
*H04L 9/32* (2006.01)
(52) U.S. Cl. .................................. 709/206; 713/170
(58) Field of Classification Search .......... 709/204–206; 380/30, 259–266
See application file for complete search history.

(56) References Cited

U.S. PATENT DOCUMENTS

| | | | |
|---|---|---|---|
| 2002/0087645 A1* | 7/2002 | Ertugrul et al. | 709/206 |
| 2002/0124177 A1 | 9/2002 | Harper et al. | |
| 2003/0132972 A1* | 7/2003 | Pang | 345/835 |
| 2005/0039034 A1 | 2/2005 | Doyle et al. | |
| 2005/0071632 A1* | 3/2005 | Pauker et al. | 713/165 |
| 2005/0114664 A1* | 5/2005 | Davin | 713/170 |
| 2005/0120212 A1 | 6/2005 | Kanungo et al. | |
| 2006/0190294 A1 | 8/2006 | Michelson et al. | |
| 2008/0065729 A1* | 3/2008 | Haas | 709/206 |

FOREIGN PATENT DOCUMENTS

EP      1788770 A1 *  5/2007

OTHER PUBLICATIONS

Shirley Gaw et al; Secrecy, Flagging, and Paranoia: Adoption Criteria in Encrypted E-Mail; 2006; ACM; 1-59593-178 ;591-600.*

* cited by examiner

*Primary Examiner* — Ashok Patel
*Assistant Examiner* — Evans Desrosiers
(74) *Attorney, Agent, or Firm* — William E. Schiesser; Ronald A. D'Alessandro; Keohane & D'Alessandro PLLC

(57) ABSTRACT

A method and program product for preventing distribution of an e-mail message. The method includes generating an e-mail message to one or more recipients using an e-mail application installed on a sender e-mail client and selecting a non-distribution option provided by a non-distribution plug-in installed on the sender e-mail client. The method further includes encrypting the message using a recipient public key and a plug-in secret key provided by the plug-in before sending the message. Further, the method includes providing a hyperlink to a website for installing a correct version of the plug-in on a recipient e-mail client for decrypting and displaying the message. Moreover, the method includes decrypting the message using a recipient private key and using the plug-in secret key provided by the plug-in and modifying the recipient e-mail client, such that one or more distribution functions are disabled, preventing distribution of the message by the recipient.

20 Claims, 12 Drawing Sheets

METHOD AND PROGRAM PRODUCT FOR PREVENTING DISTRIBUTION OF AN E-MAIL MESSAGE

FIELD OF THE INVENTION

The present invention relates to the field of electronic mail (e-mail) communications and, more particularly, the invention relates to a method and computer program product for preventing distribution of an e-mail message, in particular, preventing copying, printing, forwarding, saving and/or replying to of an e-mail message sent by a sender to one or more recipients.

BACKGROUND OF THE INVENTION

In today's business environment, organizations and/or businesses utilize electronic mail (e-mail) to communicate both internally within the organizations and/or businesses and externally with other organizations and/or businesses. Often, an initial e-mail originating from a sender gets forwarded to an unintended third party. This allows an unintended third party to view the contents of the initial e-mail and to further distribute the e-mail and/or reply back to the sender of the initial e-mail, thus, subjecting the sender to receiving reply message in response to the initial e-mail. As such, there is a need for an efficient way to communicate electronically, so that e-mails and their contents can be secured and managed in an efficient manner.

SUMMARY OF THE INVENTION

In a first aspect of the invention, there is provided a method of preventing distribution of an e-mail message. The method includes generating an e-mail message to one or more intended recipients using an e-mail application installed on a sender e-mail client and selecting a non-distribution option provided by a non-distribution plug-in installed on the sender e-mail client. The method further includes sending the e-mail message generated to the one or more intended recipients, wherein the e-mail message generated is encrypted using a secret key provided by the non-distribution plug-in before being sent to the one or more intended recipients and providing a hyperlink to a website for installing a correct version of the non-distribution plug-in on a respective recipient e-mail client corresponding to each of the one or more intended recipients for decrypting and displaying the e-mail message sent by the sender. The method further includes checking whether a correct version of the non-distribution plug-in is installed on the respective recipient e-mail client corresponding to the respective recipient of the e-mail message, if the correct version of the non-distribution plug-in is not installed, prompting the respective recipient to install the correct version of the non-distribution plug-in on the respective recipient e-mail client and decrypting, upon checking that the correct version of the non-distribution plug-in is installed on the respective recipient e-mail client corresponding to the respective recipient, the e-mail message using a respective private key corresponding to the respective recipient and using the secret key provided by the non-distribution plug-in. In an embodiment, the sending step includes encrypting the e-mail message using a respective public key corresponding to a respective recipient of the one or more intended recipients. The method further includes modifying the respective recipient e-mail client corresponding to the respective recipient of the e-mail message, wherein the non-distribution plug-in disables one or more functions provided by the respective recipient e-mail client. In an embodiment, the method includes modifying the respective recipient e-mail client corresponding to the respective recipient of the e-mail message received, wherein the e-mail message sent by the sender is stripped when the respective recipient replies to the e-mail message. Further, the method includes issuing a notification message to a recipient of the one or more intended recipients of the e-mail message when the recipient attempts to utilize a function of the one or more functions disabled by the non-distribution plug-in, wherein the function includes at least one of copying the e-mail message, printing the e-mail message, forwarding the e-mail message, saving the e-mail message and replying to the e-mail message.

In another aspect of the invention, there is provided a method of preparing an e-mail for preventing distribution of an e-mail message contained therein. The method includes installing a non-distribution plug-in on a sender e-mail client for encrypting an e-mail message created by a sender sent to one or more intended recipients, creating, using a sender e-mail client installed on a computing system, an e-mail message to one or more intended recipients in an e-mail application and selecting a non-distribution option for preventing distribution of the e-mail message created, encrypting the e-mail message created, using a secret key provided by the non-distribution plug-in installed on the sender e-mail client and transmitting the e-mail message encrypted by the non-distribution plug-in to the one or more intended recipients. The method further includes decrypting on a respective recipient e-mail client corresponding to a respective recipient of the one or more intended recipients the e-mail message received using the secret key provided by the non-distribution plug-in for displaying the e-mail message on the respective recipient e-mail client and removing the e-mail message decrypted in a reply e-mail message generated in response to the e-mail message received, wherein the respective recipient of the one or more intended recipients is prevented from distributing the e-mail message received. In an embodiment, the selecting step further includes selecting the non-distribution option for preventing one or more actions from being performed with respect to the e-mail message transmitted to the respective recipient e-mail client corresponding to the one or more intended recipients, wherein the one or more actions includes at least one of copying the e-mail message, printing the e-mail message, forwarding the e-mail message, saving the e-mail message and replying to the e-mail message. In an embodiment, the encrypting step further includes encrypting the e-mail message of sender, using a respective public key corresponding to the respective recipient of the one or more intended recipients before transmitting the e-mail message encrypted to the respective recipient of the one or more intended recipients. In an embodiment, the transmitting step further includes sending a hyperlink to a web site for enabling the installation of a correct version of the non-distribution plug-in based on the respective recipient e-mail client being used by the respective recipient of the e-mail message transmitted. In an embodiment, the decrypting step further includes decrypting the e-mail message created using a respective private key corresponding to the respective recipient of the one or more intended recipients in addition to the secret key provided by the non-distribution plug-in. In an embodiment, the decrypting step further includes checking whether the correct version of the non-distribution plug-in is installed on the respective recipient e-mail client corresponding to the respective recipient of the e-mail message transmitted and if not, prompting the respective recipient to install the correct version of the non-distribution plug-in on the respective recipient e-mail client. In an embodiment, the decrypting step further includes storing only an encrypted version of the e-mail message in a memory on the respective recipient e-mail client. The method further includes issuing a notification message to a recipient of the e-mail message when the recipient attempts an action of the one or more actions prevented by the non-distribution plug-in, wherein the action includes at least one of copying the e-mail message, printing the e-mail message, forwarding the e-mail message, saving the e-mail message and replying to the e-mail message.

In yet another aspect of the invention, there is provided a computer program product for preventing distribution of an e-mail message. The computer program product includes a computer readable medium and first program instructions to create in an e-mail application on a sender e-mail client an e-mail message addressed to one or more intended recipients, the first program instructions including instructions to select a non-distribution option using a non-distribution plug-in installed on the sender e-mail client for preventing distribution of the e-mail message. Further, the computer program product includes second program instructions to encrypt the e-mail message created by the sender using a respective public key corresponding to a respective recipient of the one or more intended recipients and to encrypt the e-mail message with a secret key provided by the non-distribution plug-in before sending the e-mail message to the respective recipient of the one or more intended recipients and third program instructions to decrypt the e-mail message on the respective recipient e-mail client using a respective private key corresponding to the respective recipient of the one or more intended recipients and to decrypt the e-mail message with the secret key provided by the non-distribution plug-in. Further, the computer program product includes fourth program instructions to modify the respective recipient e-mail client corresponding to the respective recipient of the one or more intended recipients, wherein the non-distribution plug-in disables one or more functions provided by the respective recipient e-mail client and wherein the e-mail message sent by the sender is stripped in a reply message created in response to the e-mail message. In an embodiment, the first program instructions include instructions to configure the non-distribution plug-in installed on the sender e-mail client to learn storage locations of each respective private key of one or more private keys corresponding to one or more respective recipients and to learn storage locations of each respective public key of one or more public keys corresponding to the one or more respective recipients. In an embodiment, the second program instructions include instructions to send a hyperlink to a website for automatically downloading and installing a correct version of the non-distribution plug-in corresponding to the respective recipient e-mail client being used by the respective recipient of the one or more intended recipients. In an embodiment, the third program instructions include instructions to check if the correct version of the non-distribution plug-in is installed on the respective recipient e-mail client and, if not, to prompt the respective recipient to install the correct version of the non-distribution plug-in on the respective recipient e-mail client. In an embodiment, the fourth program instructions include instructions to store in a memory on the respective recipient e-mail client corresponding to the respective recipient of the one or more intended recipients, an encrypted version of the e-mail message sent by the sender and to issue a notification message to the respective recipient when the respective recipient attempts to utilize a function of the one or more functions disabled by the non-distribution plug-in. Preferably, each of the first, second, third and fourth program instructions are stored on the computer readable medium.

Further, in yet another aspect of the invention, there is provided a process for deploying computing infrastructure that includes integrating computer-readable code into a computing system, wherein the code in combination with the computing system is capable of performing a process of preventing distribution of an e-mail message sent. The process includes installing a non-distribution plug-in on a sender e-mail client for encrypting an e-mail message created by a sender sent to one or more intended recipients, generating an e-mail message to one or more intended recipients in an e-mail application on the sender e-mail client, selecting a non-distribution option provided by the non-distribution plug-in installed on the sender e-mail client for preventing distribution of the e-mail message generated, sending the e-mail message generated to the one or more intended recipients, wherein the e-mail message generated is encrypted using a respective public key corresponding to a respective recipient of the one or more intended recipients and a secret key provided by the non-distribution plug-in before being sent to the one or more intended recipients and providing a hyperlink to a website for installing a correct version of the non-distribution plug-in on a respective recipient e-mail client corresponding to each of the one or more intended recipients for displaying the e-mail message sent by the sender. The process further includes checking, upon receipt by a respective recipient e-mail client corresponding to the respective recipient of the one or more intended recipients, whether a correct version of the non-distribution plug-in is installed on the respective recipient e-mail client corresponding to the respective recipient of the e-mail message, if the correct version of the non-distribution plug-in is not installed, prompting the respective recipient to install the correct version of the non-distribution plug-in on the respective recipient e-mail client and decrypting, upon checking that the correct version of the non-distribution plug-in is installed on the respective recipient e-mail client corresponding to a respective recipient, the e-mail message using a respective private key corresponding to the respective recipient and the secret key provided by the non-distribution plug-in. The process further includes modifying the respective recipient e-mail client corresponding to the respective recipient of the e-mail message, wherein the non-distribution plug-in disables one or more functions provided by the respective recipient e-mail client and wherein the e-mail message sent by the sender is stripped when the respective recipient replies to the e-mail message. The method further includes issuing a notification message to the respective recipient of the e-mail message when the respective recipient attempts to utilize a function of the one or more functions disabled by the non-distribution plug-in, wherein the function includes at least one of copying the e-mail message, printing the e-mail message, forwarding the e-mail message, saving the e-mail message and replying to the e-mail message.

BRIEF DESCRIPTION OF THE DRAWINGS

The accompanying drawings, which are incorporated in and form a part of this specification, illustrate embodiments of the invention and, together with the description, serve to explain the principles of the invention.

BEST MODE FOR CARRYING OUT THE INVENTION

Figure 1:
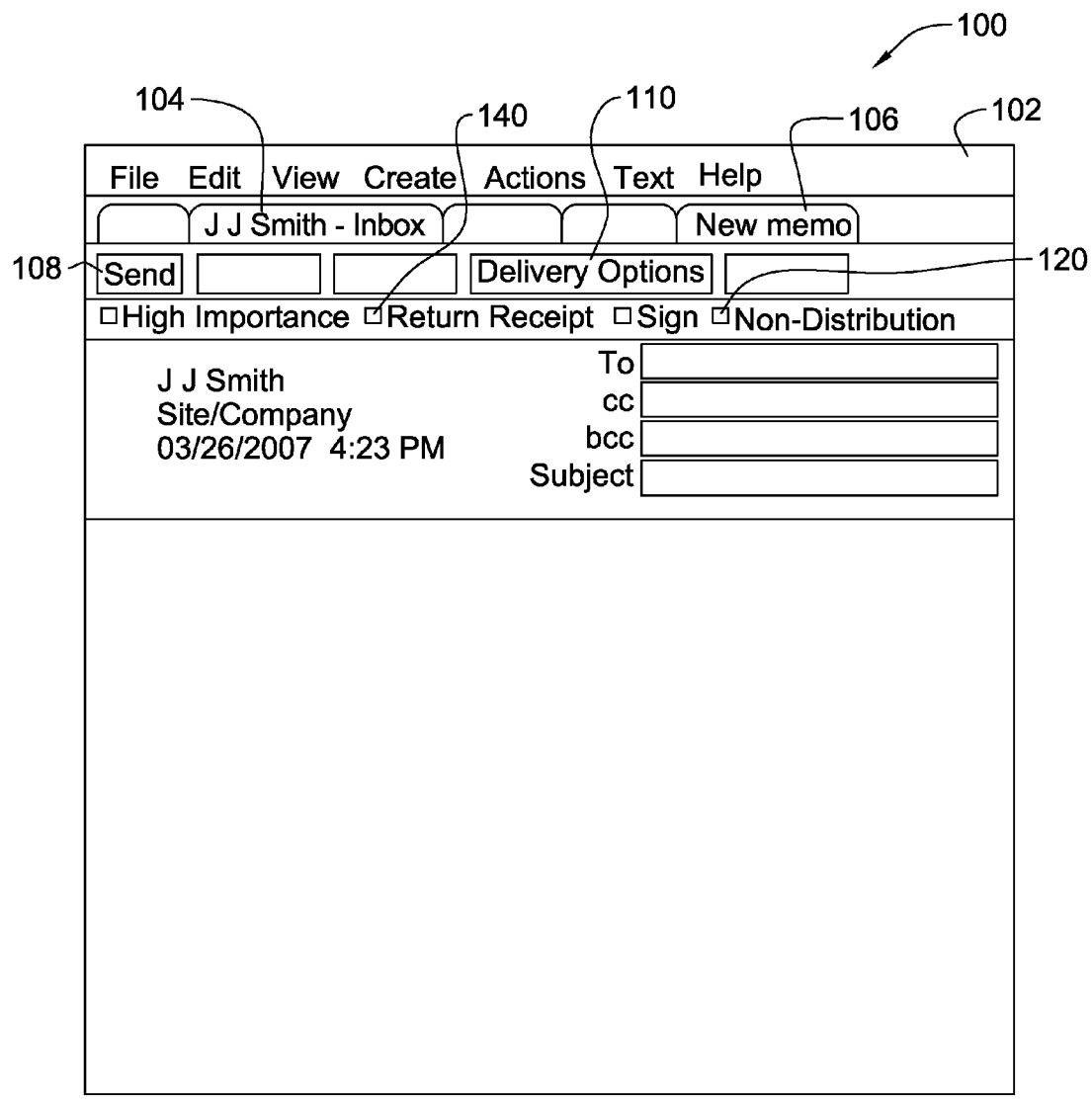
FIG. 1 is an illustration of a new e-mail composition window or screen in an e-mail application, in accordance with an embodiment of the present invention.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Moreover, the described features, structures, or characteristics of the invention may be combined in any suitable manner in one or more embodiments. It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents. Reference will now be made in detail to the preferred embodiments of the invention.

In one embodiment, the present invention provides a method for preventing distribution of a sender's e-mail message in an e-mail that is sent. The method comprises generating an e-mail message to one or more intended recipients using an e-mail application installed on a sender e-mail client and selecting a non-distribution option provided by a non-distribution plug-in installed on the sender e-mail client. The method further comprises sending the e-mail message created to the one or more intended recipients, wherein the e-mail message generated is encrypted using a secret key provided by the non-distribution plug-in before being sent to the one or more intended recipients and providing a hyperlink to a website for installing a correct version of the non-distribution plug-in on a respective recipient e-mail client corresponding to each of the one or more intended recipients for decrypting and displaying the e-mail message sent by the sender. The method further comprises checking whether a correct version of the non-distribution plug-in is installed on the respective recipient e-mail client corresponding to the respective recipient of the e-mail message, if the correct version of the non-distribution plug-in is not installed, prompting the respective recipient to install the correct version of the non-distribution plug-in on the respective recipient e-mail client and decrypting, upon checking that the correct version of the non-distribution plug-in is installed on the respective recipient e-mail client corresponding to the respective recipient, the e-mail message using a respective private key corresponding to the respective recipient and using the secret key provided by the non-distribution plug-in. In an embodiment, the sending step comprises encrypting the e-mail message using a respective public key corresponding to a respective recipient of the one or more intended recipients. The method further comprises modifying the respective recipient e-mail client corresponding to the respective recipient of the e-mail message, wherein the non-distribution plug-in disables one or more functions provided by the respective recipient e-mail client. In an embodiment, the method comprises modifying the respective recipient e-mail client corresponding to the respective recipient of the e-mail message received, wherein the e-mail message sent by the sender is stripped when the respective recipient replies to the e-mail message. Further, the method comprises issuing a notification message to a recipient of the one or more intended recipients of the e-mail message when the recipient attempts to utilize a function of the one or more functions disabled by the non-distribution plug-in, wherein the function comprises at least one of copying the e-mail message, printing the e-mail message, forwarding the e-mail message, saving the e-mail message and replying to the e-mail message.

As used herein, the term "e-mail" refers to an electronic mail composed using any e-mail application program, preferably, a commercially available e-mail application program, such as, the Lotus Notes® e-mail application program that is commercially available from International Business Machines Corporation (IBM) or the Microsoft® Outlook e-mail application program that is commercially available from Microsoft Corporation. Also, the term "e-mail" or "e-mail message" or "original e-mail" or "initial e-mail" is intended to refer to an initial e-mail that is created or generated by a sender. Further, as used herein, the term "intended recipient(s)" or "initial recipient(s)" or "specified recipient(s) or "recipient(s)" refers to the recipient or recipients specified in any of the recipient groups or sections, such as the "To"

group, the "cc" group or the "bcc" group of the original e-mail composed by a sender who selects the one or more intended recipients from a list of recipients in an address book or by entering an e-mail message. Moreover, the term "unintended recipient(s)" or "new recipient(s)" refers to any recipient that was not specified in any of the recipient groups of the original e-mail that was sent. Additionally, the term "recipient" is intended to include both an individual recipient as well as a group of individuals that are categorized together as one recipient.

Figure 2A:
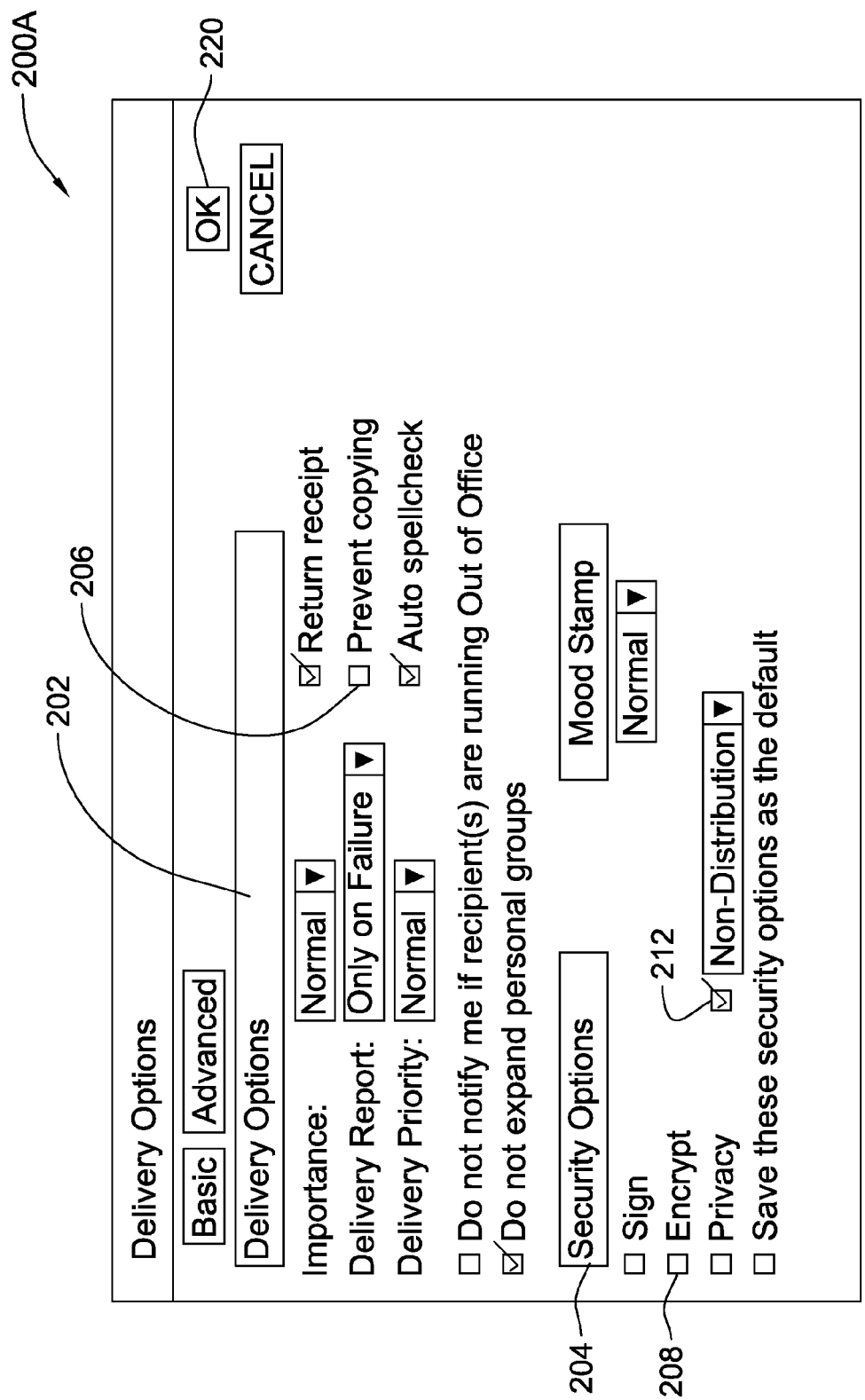
FIG. 2A is an illustration of a Delivery Options sub-window or sub-screen for selecting a non-distribution option for preventing distribution of an original e-mail message that is sent, in accordance with an embodiment of the present invention.
Figure 2B:
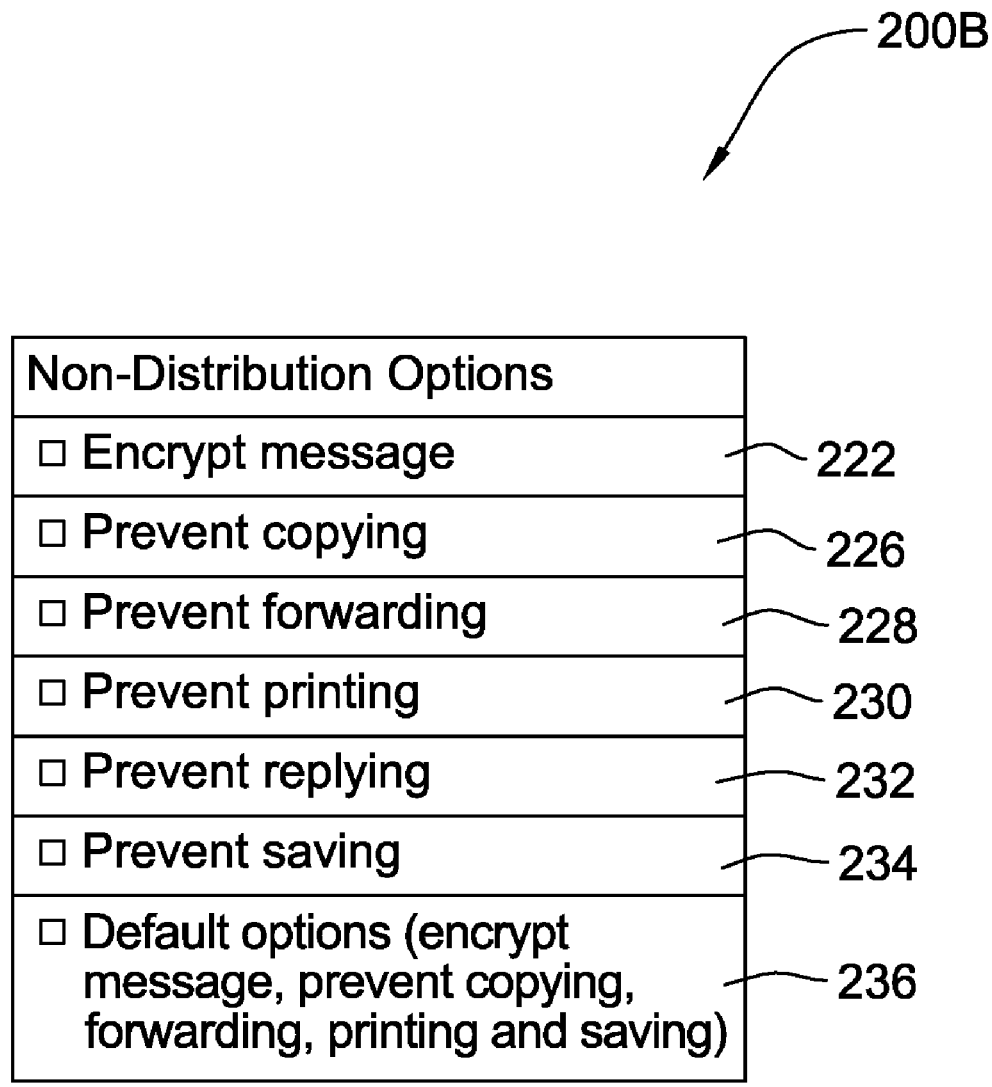
FIG. 2B is an illustration of a Non-Distribution Options sub-window or sub-screen for selecting one or more non-distribution options for preventing distribution of an original e-mail message that is sent, in accordance with an embodiment of the present invention.
Figure 3:
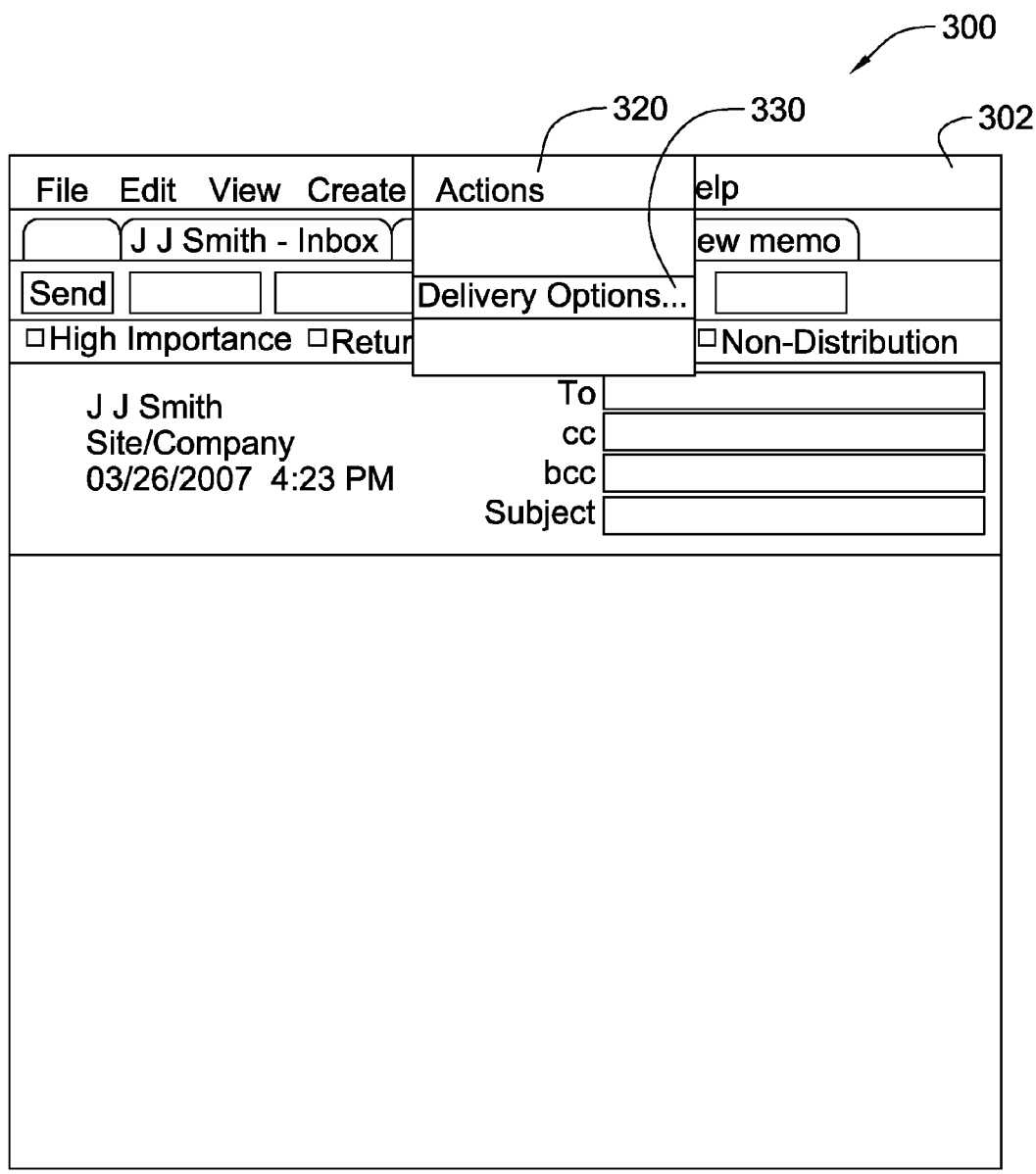
FIG. 3 is an illustration of a new e-mail composition window or screen in an e-mail application showing an alternate method for selecting a non-distribution option for preventing distribution of an original e-mail message that is sent, in accordance with an embodiment of the present invention.

Reference is now made to FIGS. 1 through 10, which illustrate a method of preventing distribution of an initial or original e-mail message created and sent by a sender on an e-mail client on which a non-distribution plug-in has been installed, in accordance with an embodiment of the invention. Turning to FIG. 1, numeral 100 shows an e-mail composition window in an e-mail client for creating a new e-mail message. In particular, FIG. 1 shows a sender "J J Smith" has chosen to create a new message or memo (indicated by the "New Memo" tab 106 towards the top of the window 100) in his inbox (as indicated by the "J J Smith—Inbox" tab 104). The new e-mail composition window 100 shows a main menu bar 102 at the top that contains the main menu items File, Edit, View, Create, Actions, Text and Help. Further, the new e-mail composition window 100 shows a "Send" button 108 for sending an e-mail message that is created and a "Delivery Options" button 110 for selecting various delivery and security options, such as, the option box 140 labeled "Return Receipt" and the prevent distribution option box 120 labeled "Non-Distribution". It is understood that the e-mail composition window will differ slightly depending on the e-mail client being used. In one embodiment, a sender, J J Smith, can choose to prevent distribution of an e-mail message created and sent by clicking on the Delivery Options button 110, which takes the sender to a Delivery Options menu screen 200A, as shown in FIG. 2A. The Delivery Options screen 200A shows several options under the Delivery Options bar 202 for an e-mail message that a sender can choose from when sending the e-mail message, such as, performing a spell check of the e-mail message (box labeled "Auto spellcheck") before sending the e-mail message or obtaining a return receipt from a recipient specified in the e-mail message (box labeled "Return receipt"). As shown in FIG. 2A, the sender has requested a spell check (indicated by the checked box "Auto spellcheck") and a return receipt (indicated by the checked box "Return Receipt"). Further, as shown in FIG. 2A, under the Security Options bar 204, the sender can choose several security options for the e-mail message. In particular, the sender can select or choose and is shown to have selected or chosen a "Non-distribution" option (reference numeral 212) for preventing distribution of the e-mail message by any other party besides the sender. In an embodiment, the non-distribution option is provided by the non-distribution plug-in installed on the sender's e-mail client, which encrypts an e-mail message created by the sender using both a respective recipient's public key and a secret key provided by the non-distribution plug-in before sending the message to an intended recipient. Further, the non-distribution option provided by the non-distribution plug-in modifies a recipient's e-mail client in order to prevent a recipient from copying, printing, forwarding, saving and/or replying to the e-mail message received, as will be discussed further herein below. In an embodiment, the non-distribution option 212 provides a drop-down menu from which a sender can select or choose options for customizing the non-distribution option 212 selected for an e-mail message, as will be discussed herein below with respect to FIG. 2B. Further, as shown in FIG. 2A, under the Security Options bar 204, the sender could have chosen to encrypt the entire e-mail message created by selecting or clicking on the Encrypt box 208 on the sender's e-mail client, however, the encrypt option 208 would have only provided one layer of security given that only a private key of a recipient is needed to view the e-mail message, thus, if an unintended recipient intercepts or receives the e-mail message and if the unintended recipient is able to access the private key of the intended recipient, the unintended recipient would be able to decrypt and view the message. As such, the use of a secret key provided by the non-distribution plug-in to decrypt the e-mail message provides a further level of security in preventing the distribution of an e-mail message sent. Moreover, the Encrypt option 208 does not prevent saving or storing of the decrypted e-mail message on a recipient's e-mail client nor does the Encrypt option 208 prevent the printing, copying, forwarding, replying and/or saving of the message by a recipient. Alternatively, as shown in FIG. 2A, a sender could have clicked on or selected the "Prevent Copying" option (box reference numeral 206) for preventing a recipient from copying, forwarding and printing the e-mail message that is sent. However, the "Prevent Copying" option 206 only prevents a recipient from copying, forwarding and printing the e-mail message when the recipient uses the same type of e-mail client as the sender. Accordingly, selecting or clicking on the "Non-distribution" button 212 on a sender e-mail client that has installed on it the Non-distribution plug-in, takes the sender to another sub-screen or pop-up screen 200B shown in FIG. 2B. As shown in FIG. 2B, the sender can select one or more options provided by the non-distribution options or sub-screen box 200B. For instance, the sender can and has chosen the default options box 236 provided by the non-distribution options, which provides the default non-distribution options of encrypting the e-mail message and, further, preventing copying, forwarding, printing and saving of the e-mail message by a recipient. Alternatively, the non-distribution options sub-screen 200B provides a sender the option of disabling only some of the distribution functions provided by a recipient e-mail client, such as, encrypting message (box 222), prevent copying (box 226), prevent forwarding (box 228), prevent printing (box 230), prevent replying (box 232), and/or prevent saving (box 234) of the e-mail message received. Accordingly, a sender can select any of the non-distribution options provided in FIG. 2B for customizing the non-distribution option 212 selected in FIG. 2A for an e-mail message, such that only a few of the non-distribution options are selected. For instance, if a sender wants no replies to the e-mail message, the sender would select the "prevent replying" box 232 and if a sender wants to prevent forwarding, then the sender would select the "prevent forwarding" box 228. Further, in an embodiment, if a sender wants to only prevent distribution of a sensitive paragraph in the e-mail message being created, then in an embodiment, the sender would highlight the paragraph that the sender wishes to apply the non-distribution option to and would right click on the highlighted paragraph, which would take the sender to a right-click menu, from which the sender would select or click on the non-distribution option, such that, a pop-up screen would appear giving the sender the same option as shown in FIG. 2B. It is understood that other variations of the non-distribution options can be provided by the non-distribution plug-in, such as, preventing, copying and/or forwarding of only part of the message that is encrypted. As such, once the sender has selected the desired delivery options provided in FIGS. 2A and 2B, the sender clicks on the OK button 220 in FIG. 2A, which takes the sender back to the e-mail message screen 100 shown in FIG. 1. Moreover, in an alternative embodiment, as shown in FIG. 3, in the e-mail composition window 300, a sender could choose to prevent distribution of the sender's e-mail message by pulling down on the Actions sub-menu 320 on the Main menu bar 302. In the Actions sub-menu, among other options, is an option for Delivery Options 330, which a sender can select or click on in order to get to the Delivery Options screen 200A as shown in FIG. 2A. Once a sender is at the Delivery Options screen 200A, the sender proceeds to select delivery options under the Delivery Options bar 202 and/or security options under the Security Options bar 204, as described herein above.

Figure 4:
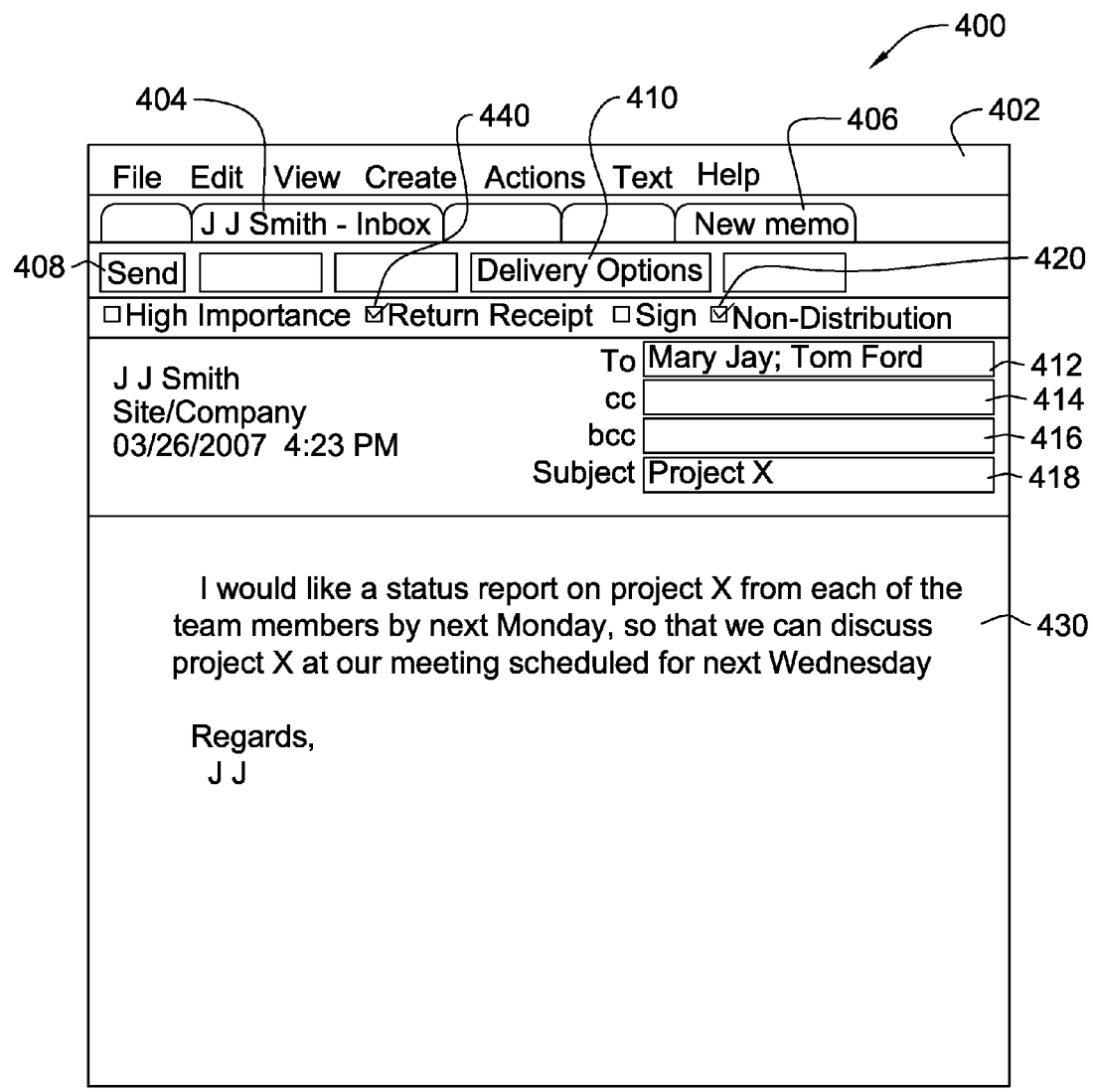
FIG. 4 is an illustration of a new e-mail message in an e-mail composition window or screen in an e-mail application showing intended recipients and showing that a non-distribution or copy protection option has been selected, in accordance with an embodiment of the present invention.

Accordingly, once a sender has selected the prevent distribution option for preventing distribution of the sender's e-mail message, the sender is taken back to the e-mail composition window, which is now shown as reference numeral 400 in FIG. 4. As shown in FIG. 4, the e-mail composition window 400 shows the "New Memo" tab 406 towards the top of the window 400) in the sender, J J Smith's, inbox (as indicated by the "J J Smith—Inbox" tab 404). The e-mail composition window 400 shows a main menu bar 402 at the top that contains the main menu items File, Edit, View, Create, Actions, Text and Help. Further, the e-mail composition window 400 shows a "Send" button 408 for sending any e-mail message that is created and a "Delivery Options" button 410 for selecting various delivery and security options (as discussed above with respect to FIG. 2A), such as, selecting a delivery option for obtaining a return receipt from a recipient. As shown in FIG. 4, the sender J J Smith has selected a "Return Receipt" option (indicated by the checked box 440 labeled "Return Receipt", which is shown in the e-mail composition window 400). Further, the sender J J has chosen or selected the "Non-distribution" option from the Delivery Options menu (indicated by the checked box 420 labeled "Non-distribution", as discussed hereinabove with respect to FIG. 2A for encrypting the e-mail message and for preventing distribution of the sender's e-mail message that is created and sent to one or more intended recipients. It is understood that other delivery and security options may be shown in the e-mail composition window based on the e-mail client being used by the sender. Further, the e-mail window 400 in FIG. 4 shows that the sender has specified recipients in the To recipient group or section 412, but that no recipients have been specified for either of the cc section 414 or the bcc section 416. In particular, the e-mail composition window 400 shows that the names of the specified or intended recipients are "Mary Jay" and "Tom Ford". Moreover, as shown in FIG. 4, the e-mail composition window 400 shows that the sender J J has entered in the Subject section 418 the subject title "Project X". Additionally, the sender J J has generated or created a message in the message section 430. Once the sender J J has finished composing the e-mail message, the sender selects or clicks on the Send button 408 to send the message.

When the sender of the e-mail message clicks on the Send button 408, the non-distribution plug-in that is installed on the sender's e-mail client is launched given that the sender (J J) has chosen the Non-distribution option box 212 in FIG. 2A and 420 in FIG. 4. As such, the non-distribution plug-in encrypts the sender's e-mail message before transmitting or sending the e-mail message to the intended recipients. In an embodiment, the e-mail message created by the sender is encrypted using public-key infrastructure (PKI) cryptography. Further, in an embodiment, the non-distribution plug-in installed on the sender e-mail client is configured to learn storage locations of each respective private key of one or more private keys corresponding to one or more respective recipients and to learn storage locations of each public key of one or more public keys corresponding to the one or more respective recipients. Accordingly, the non-distribution plug-in installed on the sender's e-mail client encrypts the sender's e-mail message using a respective public key corresponding to a respective recipient specified in the e-mail and further encrypts the sender's e-mail message using a secret plug-in key provided by the non-distribution plug-in. For the example shown in FIG. 4, the non-distribution plug-in encrypts the e-mail message of the sender, J J Smith, in the e-mail message that is sent to the intended recipient, Mary, using a public key of the recipient, Mary and using a secret plug-in key provided by the non-distribution plug-in. Similarly, the non-distribution plug-in encrypts the e-mail message of J J in the e-mail message that is sent to the intended recipient, Tom Ford, using a public key of the recipient, Tom and using a secret plug-in key (also referred to herein as secret key) provided by the non-distribution plug-in. Further, in an embodiment, the non-distribution plug-in sends or provides a hyperlink to a web site for enabling the installation of a correct version of the non-distribution plug-in on a recipient's client for decrypting the sender's e-mail message in order for a recipient to be able to read the sender's e-mail message, as will be discussed further herein below with reference to FIG. 5.

As explained hereinabove with respect to FIGS. 1-4, a sender creates an e-mail message on an e-mail client that has a non-distribution plug-in installed thereon, which e-mail is intended for one or more recipients that are specified in any of the To, cc and/or bcc section of the e-mail message. In particular, the sender selects the non-distribution option for the e-mail message as described hereinabove with respect to FIGS. 1-3. Further, the sender sends the created or generated e-mail message by clicking on the Send button 408 (in FIG. 4) from the sender's e-mail client. When the sender of the e-mail message clicks on the Send button 408, the non-distribution plug-in that is installed on the sender's e-mail client is launched given that the sender has chosen the Non-distribution option box 420 in FIG. 4. As such, the non-distribution plug-in encrypts the sender J J's e-mail message before transmitting or sending the e-mail message to the intended recipients, Mary and Tom. In particular, the non-distribution plug-in installed on the sender's e-mail client encrypts, for instance, using public-key infrastructure (PKI) cryptography, the sender's e-mail message that is sent to the intended recipient, Mary, using a public key of the recipient Mary and using a secret plug-in key. Similarly, the non-distribution plug-in encrypts the e-mail message of the sender J J sent to the intended recipient, Tom, using a public key of the recipient Tom and the secret plug-in key, so that even if the e-mail message is intercepted by an unintended recipient, the unintended recipient cannot decrypt the e-mail message and, thus, cannot read the e-mail message received from the sender. Further, in an embodiment, the non-distribution plug-in displays a notification message notifying the recipient of the non-distribution plug-in and provides a hyperlink to a web site for enabling the installation of a correct version of the non-distribution plug-in or for accessing or downloading the non-distribution plug-in on a recipient's e-mail client, based on the e-mail client being used by the recipient, for decrypting the sender's e-mail message so that a recipient is able to view or read the e-mail message sent by the sender, as will be discussed herein below with reference to FIG. 5.

Figure 5:
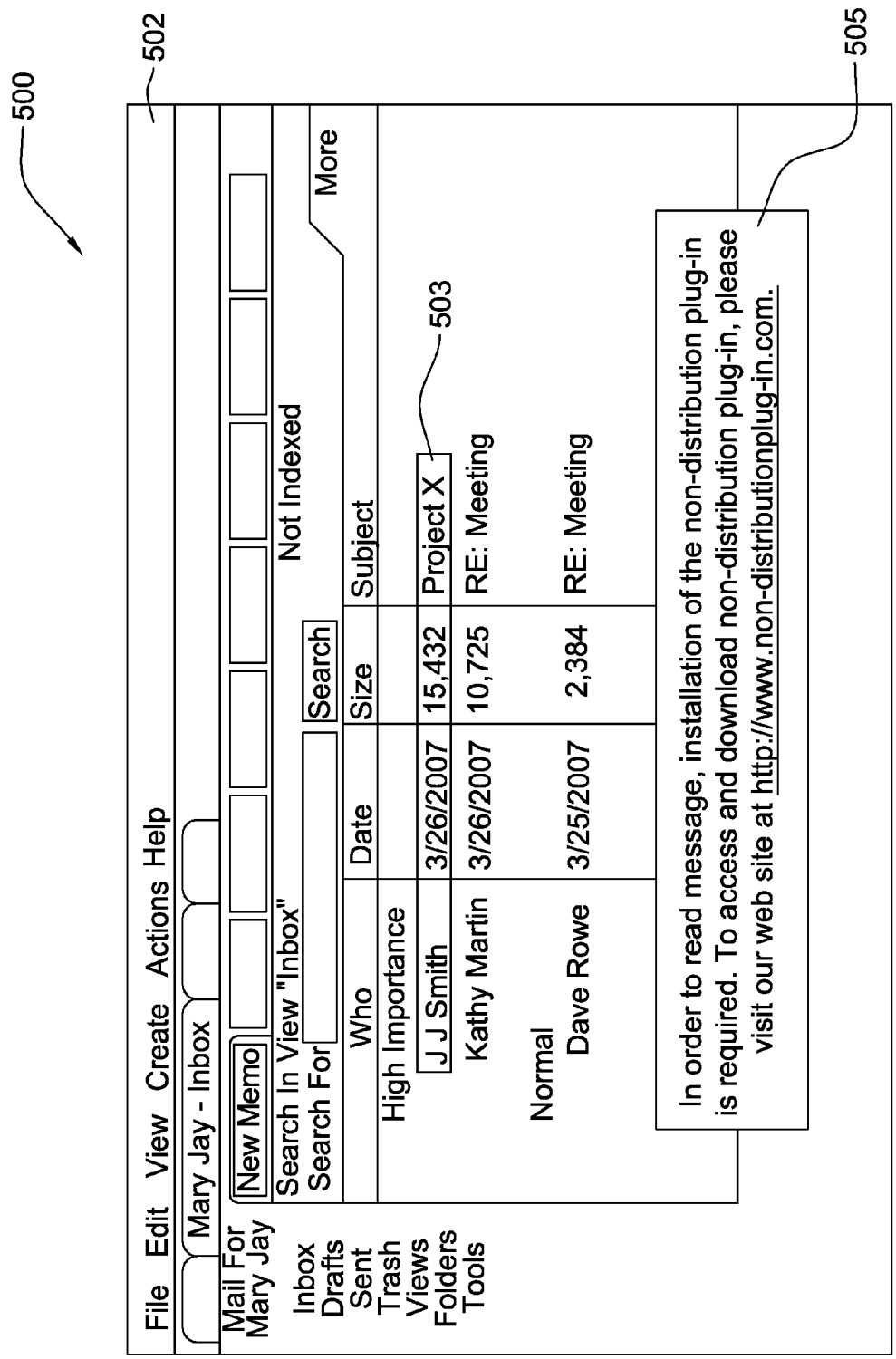
FIG. 5 is an illustration of an e-mail inbox of an intended recipient, showing a pop-up screen notifying the recipient of the non-distribution plug-in requirement and a hyperlink to download the non-distribution plug-in, in accordance with an embodiment of the present invention.
Figure 6:
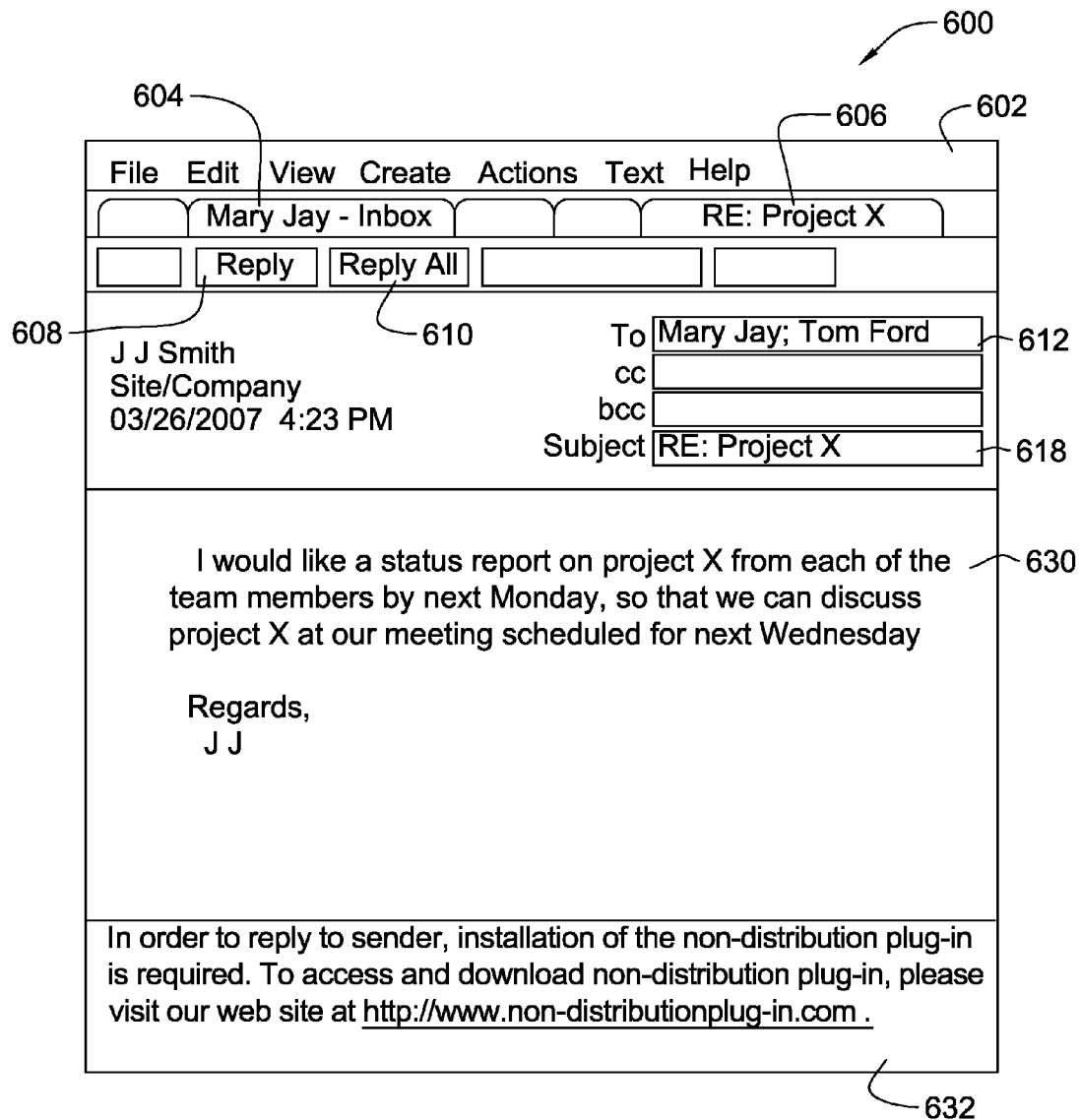
FIG. 6 is an illustration of an e-mail window or screen in an e-mail application when an intended recipient clicks on the e-mail message received from sender shown in FIG. 5, in accordance with an embodiment of the present invention.

Turning to FIG. 5, reference numeral 500 shows the inbox window of one of the two intended recipients, namely, Mary, to whom J J's e-mail message was sent. The screen or window 500 shows a Main Menu bar 502 at the top that contains the main menu items File, Edit, View, Create, Actions, Text and Help. Further, the screen FIG. 5 shows e-mail messages that are received by the recipient in the inbox folder. In particular, Mary's inbox window 500 shows an e-mail message from J J Smith (under the Who column) with a Subject entitled "Project X" (as shown by the highlighted box 503). Accordingly, when Mary places the cursor on J J's e-mail received in the inbox, the e-mail window 500 also displays a notification message 505 that notifies or informs the recipient, Mary, that in order to view or read the message from J J Smith, installation of the non-distribution plug-in is required. In an embodiment, the notification message can be via a pop-up screen. Further, the notification message 505 provides a hyperlink to a web site, for instance, http://www.non-distributionplug-in-.com for downloading an appropriate non-distribution plug-in based on the e-mail client that the recipient is using, in this case, the e-mail client that Mary is using. Accordingly, if the recipient, Mary, is using a different e-mail client than the sender, J J and/or if Mary does not have the correct version of the non-distribution plug-in, then the notification would direct Mary to the website in order to download and install the appropriate non-distribution plug-in. In an embodiment, if a non-distribution plug-in version has already been installed on an e-mail client, before a recipient can read the e-mail message that is received, the non-distribution plug-in automatically and transparently launches the hyperlink to a web site for checking whether a correct version of the non-distribution plug-in is installed, so that a recipient can read the e-mail message (without the hyperlink being displayed). It is understood that the notification 505 can contain a hyperlink to a different web site suitable for installation of the non-distribution plug-in. In an embodiment, the non-distribution plug-in can be integrated in any e-mail program, thus, facilitating the encryption and decryption of an e-mail message to be performed automatically. Accordingly, if Mary has the non-distribution plug-in installed or after downloading an appropriate version of the non-distribution plug-in, Mary can click in FIG. 5 on J J Smith's e-mail message, which decrypts and displays the e-mail message received, as shown in FIG. 6, discussed herein below. In particular, the non-distribution plug-in decrypts the e-mail message of the sender, J J, using Mary's private key and using a secret plug-in key (or referred to herein as secret key) in order to decrypt and display the e-mail message. In an embodiment, the e-mail message of the sender is decrypted using public-key infrastructure (PKI) cryptography, as discussed herein above. In an embodiment, the secret key used to encrypt the e-mail message is the same secret key used to decrypt the e-mail message. In another embodiment, the secret key used to encrypt the e-mail message is different from the secret key used to decrypt the e-mail message. Further, the non-distribution plug-in stores the decrypted e-mail message only in memory and not in the recipient's inbox, such that, the message shown in the inbox is encrypted and uses the non-distribution plug-in to decrypt the message for viewing purposes. As such, if a recipient uninstalls the non-distribution plug-in on the recipient's e-mail client, the recipient would be unable to view the e-mail message without re-installing the non-distribution plug-in. Further, the non-distribution plug-in modifies the recipient's e-mail client by automatically disabling the copying, forwarding, printing, replying and/or saving functions provided by the recipient's e-mail client, such that, the recipient cannot copy, forward, print, reply and/or save the e-mail message.

Figure 7:
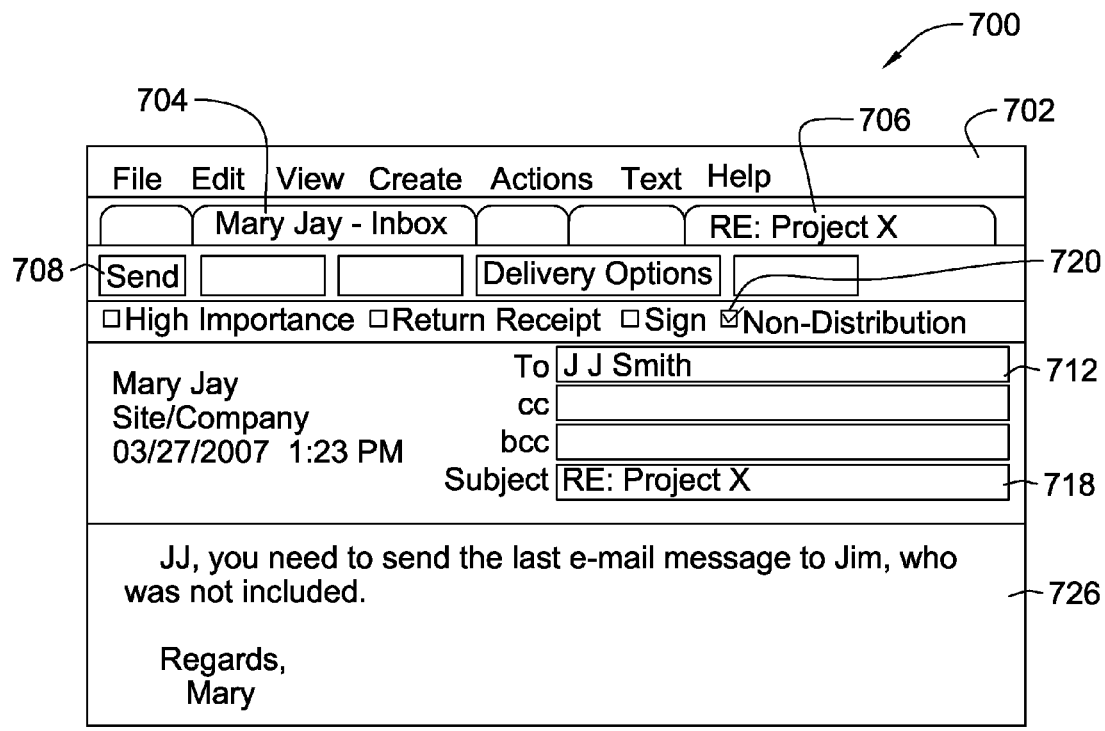
FIG. 7 is an illustration of a reply e-mail composition window or screen in an e-mail application when an intended recipient decides to reply to the e-mail message received in FIG. 6, in accordance with an embodiment of the present invention.
Figure 8:
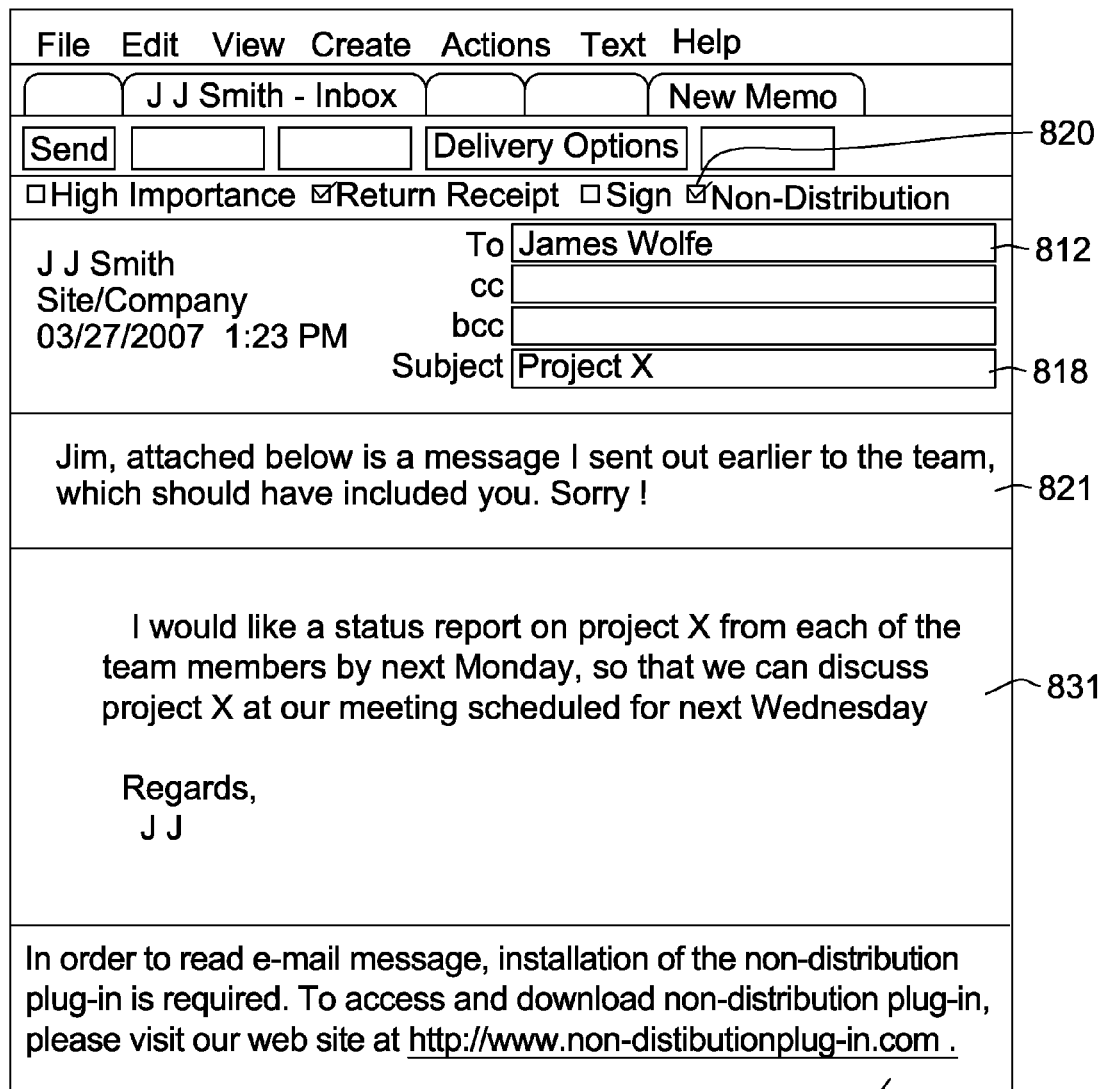
FIG. 8 is an illustration of a new e-mail composition window showing an e-mail composed by sender that has a copy of the original message copied to send to another intended recipient, in accordance with an embodiment of the present invention.

Turning to FIG. 6, reference numeral 600 shows or displays the decrypted e-mail message 630 received from the sender J J (indicated by the "RE: Project X" tab 606 in the intended recipient Mary's e-mail client (indicated by the "Mary Jay—Inbox" tab 604. The screen 600 shows a Main Menu bar 602 at the top that contains the main menu items File, Edit, View, Create, Actions, Text and Help. Further, the recipient e-mail window of the e-mail message received shows in the To section 612 the names of the intended recipients specified in the e-mail message that was sent by J J, namely, Mary Jay and Tom Ford and the Subject RE: Project X in box 618. Additionally, the e-mail window 600 also displays the notification message 632 notifying or informing the recipient, Mary, that in order to view or read the message from J J, installation of the non-distribution plug-in is required. Further, FIG. 6 shows that the recipient can choose to reply to the sender of the e-mail message 630 received by selecting or clicking on the Reply button 608. Furthermore, the recipient Mary can reply to both the sender J J and the other recipient Tom by clicking on the "Reply all" box 610, however, the reply message would again delete the e-mail message received from the sender and would only contain any reply message that is created by the recipient. However, as shown in FIG. 7, Mary has chosen to only reply to the sender J J. As such, the recipient, Mary selects or clicks on the Reply button 608, which takes the recipient, Mary to the screen 700 shown in FIG. 7, as discussed herein below. In an embodiment, when the recipient, Mary, replies to the e-mail message 600 by selecting or clicking on the Reply button 608 shown in FIG. 6, the recipient is taken to a reply screen or window 700 as shown in FIG. 7. In an embodiment, the reply screen 700 shows a reply e-mail message composition window (as indicated by the "RE: Project X" tab 706) in the intended recipient, Mary's inbox, shown by the "Mary Jay—Inbox" tab 704. Also, the reply e-mail message screen 700 shows a Main Menu bar 702 at the top that contains the main menu items File, Edit, View, Create, Actions, Text and Help. Further, as shown in FIG. 7, the reply message is addressed in the To field to J J Smith (box 712) with the Subject box 718 containing "RE: Project X". Alternatively, Mary could have chosen the Reply All button 610 in FIG. 6, in which case, the e-mail window shown in FIG. 7 would also contain Tom's name in the To box 712. Further, in the e-mail reply window 700, the non-distribution option 720 is shown as being automatically selected as per the check mark shown in the box 720, given that the recipient's e-mail client has been modified. Accordingly, the non-distribution plug-in automatically deletes or hides or removes the initial e-mail message (reference numeral 630 shown in FIG. 6) received from the sender J J Smith in the reply window 700 and, as such, the reply e-mail message does not contain the original message (reference numeral 630 in FIG. 6) sent by the sender, J J, but only contains any reply message that is created by the recipient in response to the initial e-mail message, as shown in box 726. In particular, as shown in the reply e-mail window 700, the recipient has generated a reply message (reference numeral 726), which is sent to the sender by clicking on or selecting the Send button 708, shown towards the top of the screen.

Furthermore, referring back to FIG. 6, the recipient (Mary Jay) is also unable to forward the e-mail message received from the sender (J J Smith) given that a Forward button is unavailable for the recipient to select or click on. In an alternative embodiment (not shown in FIG. 6), the e-mail message 600 could display or provide a Forward button similar to the Reply button 608, such that, the recipient could select or choose to click on the Forward button to forward the e-mail. However, in the latter case, when the recipient clicks on the forward button, another pop-up screen or notification message is displayed informing the recipient that the forward function has been disabled and that the recipient cannot forward the e-mail message to another party. Accordingly, as shown in the reply message 726 in FIG. 7 created by the recipient Mary, even if a third party should have been included as an intended recipient in the original e-mail message sent by the sender J J Smith, the recipient Mary can only inform the sender and cannot forward the e-mail message to the recipient that was left out in the initial e-mail. Once the sender is notified of the omission, the sender (J J) can copy into a new e-mail window 800, shown in FIG. 8, the initial e-mail message (now designated reference numeral 831 in FIG. 8) and can additionally create or add in a new message (reference numeral 821) that can be sent to the omitted recipient, in this case James Wolfe (as shown in the To field, reference numeral 812) with a subject in the box 818, such as, "Project X". In particular, the sender is able to copy the original e-mail message given that the sender has an unencrypted version of the original e-mail message saved on the sender's e-mail client and, as such, the sender is able to perform the functions that are disabled by the non-distribution plug-in. Again, the e-mail message created has the non-distribution option checked in box 820 and, as such, the e-mail message informs or notifies the recipient, James Wolfe, in the bottom screen 832 that the non-distribution plug-in is required in order to view or read the e-mail message. Further, the notification message or screen 832 provides a hyperlink to a web site, for instance, http://www.non-distributionplug-in.com for downloading an appropriate non-distribution plug-in based on the e-mail client that the recipient, in this case, the e-mail client that James Wolfe is using. Accordingly, if the recipient, James, is using a different e-mail client than the sender, J J and/or if James does not have the correct version of the non-distribution plug-in, then the notification would direct James to the website in order to download and install the appropriate non-distribution plug-in. In an embodiment, if a non-distribution plug-in version has already been installed on James' e-mail client, before James can read the e-mail message that is received, the non-distribution plug-in automatically and transparently launches the hyperlink to the appropriate web site for checking whether a correct version of the non-distribution plug-in is installed, so that James can read the e-mail message (without being shown the hyperlink). Again, it is understood that the notification 832 can contain a hyperlink to a different web site suitable for installation of the non-distribution plug-in and/or that the notification message can be via a pop-up screen.

Once the non-distribution plug-in has been installed on the sender's e-mail client and each of the respective recipient's e-mail clients, an intended recipient can reply to the sender and/or the other recipient(s) of the sender's e-mail message, however, the reply message does not contain the original or initial e-mail message, thus, preventing the recipient from forwarding, printing, copying and/or saving the original e-mail message. Further, if a recipient chooses to uninstall the non-distribution plug-in, the recipient removes the ability to decrypt and view the message, thus, preventing the recipient from forwarding, copying or printing the message, given that the message remains encrypted and can only be decrypted with the recipient's private key and the plug-in secret key provided by the non-distribution plug-in.

In another embodiment, the invention provides a method of preparing an e-mail for preventing distribution of an e-mail message contained therein. The method comprises installing a non-distribution plug-in on a sender e-mail client for encrypting an e-mail message created by a sender sent to one or more intended recipients, creating, using a sender e-mail client installed on a computing system, an e-mail message to one or more intended recipients in an e-mail application and selecting a non-distribution option for preventing distribution of the e-mail message created, encrypting the e-mail message created, using a secret key provided by the non-distribution plug-in installed on the sender e-mail client and transmitting the e-mail message encrypted by the non-distribution plug-in to the one or more intended recipients. The method further comprises decrypting on a respective recipient e-mail client corresponding to a respective recipient of the one or more intended recipients the e-mail message received using the secret key provided by the non-distribution plug-in for displaying the e-mail message on the respective recipient e-mail client and removing the e-mail message decrypted in a reply e-mail message generated in response to the e-mail message received, wherein the respective recipient of the one or more intended recipients is prevented from distributing the e-mail message received. In an embodiment, the selecting step further comprises selecting the non-distribution option for preventing one or more actions from being performed with respect to the e-mail message transmitted to the respective recipient e-mail client corresponding to the one or more intended recipients, wherein the one or more actions comprises at least one of copying the e-mail message, printing the e-mail message, forwarding the e-mail message, saving the e-mail message or replying to the e-mail message. In an embodiment, the encrypting step further comprises encrypting the e-mail message of sender, using a respective public key corresponding to the respective recipient of the one or more intended recipients before transmitting the e-mail message encrypted to the respective recipient of the one or more intended recipients. In an embodiment, the transmitting step further comprises sending a hyperlink to a web site for enabling the installation of a correct version of the non-distribution plug-in based on the respective recipient e-mail client being used by the respective recipient of the e-mail message transmitted. In an embodiment, the decrypting step further comprises decrypting the e-mail message created using a respective private key corresponding to the respective recipient of the one or more intended recipients in addition to the secret key provided by the non-distribution plug-in. In an embodiment, the decrypting step further comprises checking whether the correct version of the non-distribution plug-in is installed on the respective recipient e-mail client corresponding to the respective recipient of the e-mail message transmitted and if not, prompting the respective recipient to install the correct version of the non-distribution plug-in on the respective recipient e-mail client. In an embodiment, the decrypting step further comprises storing only an encrypted version of the e-mail message in a memory on the respective recipient e-mail client. The method further comprises issuing a notification message to a recipient of the e-mail message when the recipient attempts an action of the one or more actions prevented by the non-distribution plug-in, wherein the action comprises at least one of copying the e-mail message, printing the e-mail message, forwarding the e-mail message, saving the e-mail message or replying to the e-mail message.

Figure 9:
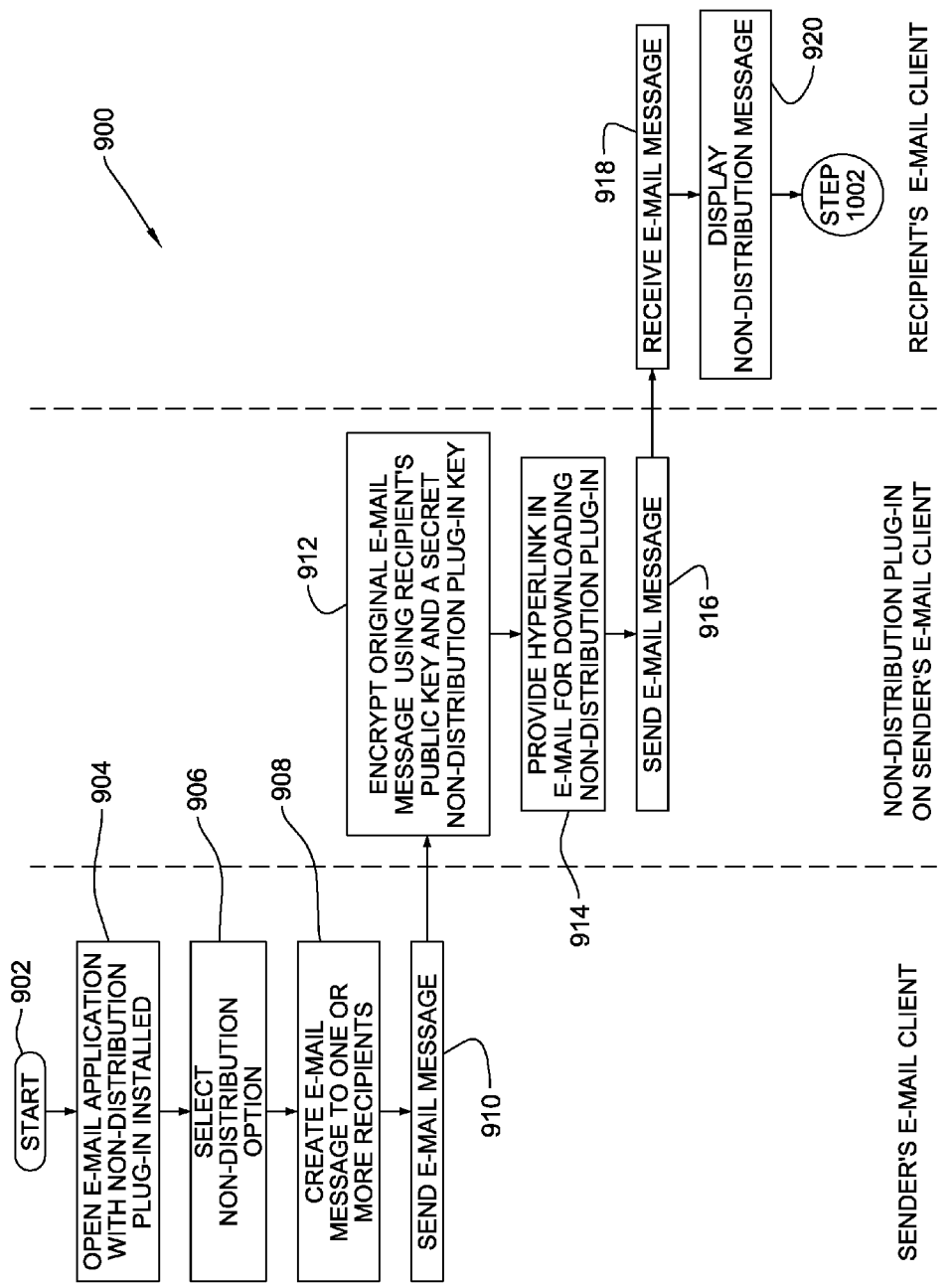
FIG. 9 is a flowchart depicting a method of preventing distribution of a sender's e-mail message in an e-mail that is sent, in accordance with an embodiment of the present invention.
Figure 10:
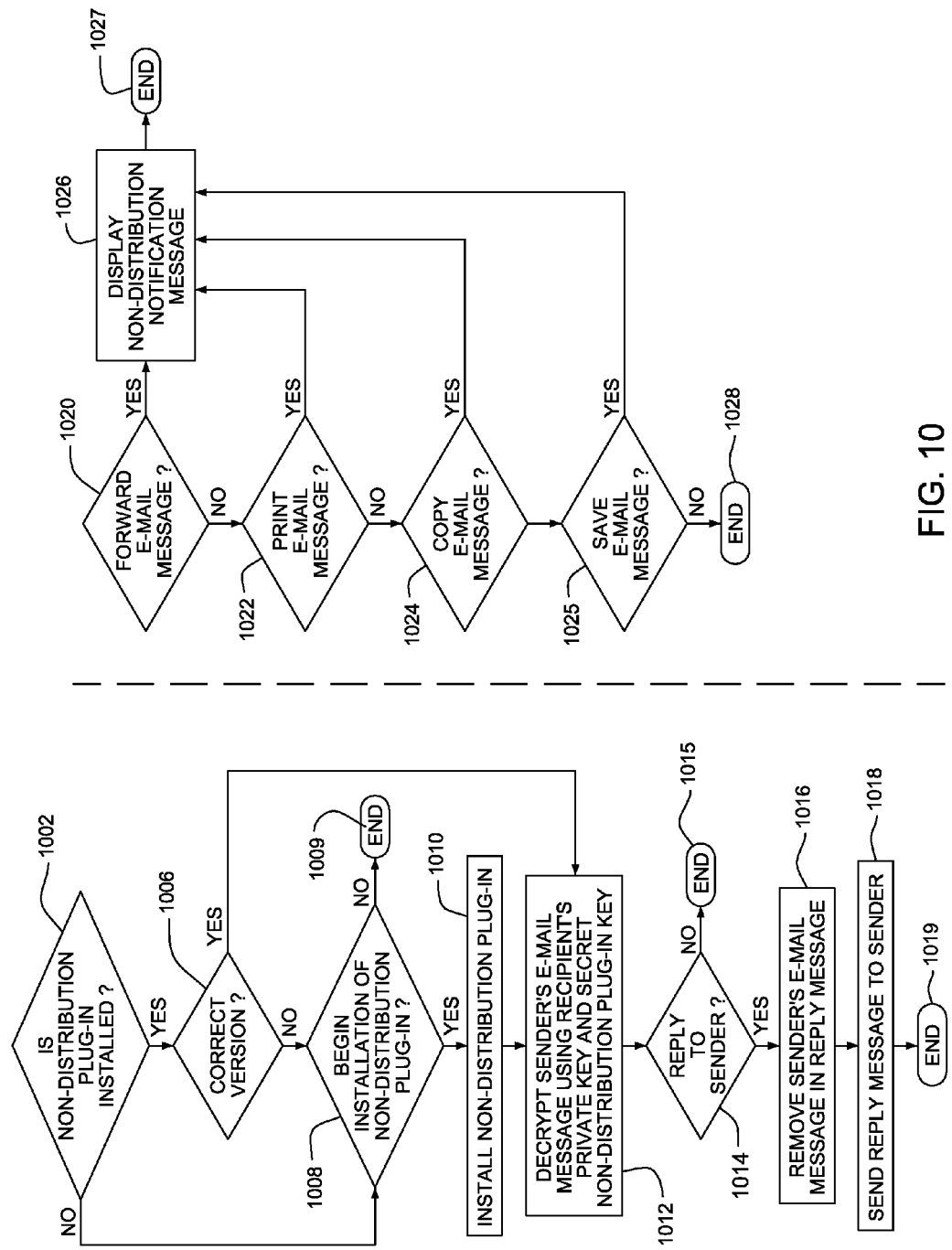
FIG. 10 is a flowchart depicting a method of preventing distribution of a sender's e-mail message received by an intended recipient, in accordance with an embodiment of the present invention.

Reference is now made to FIGS. 9 and 10, which outline the steps involved in different aspects of preventing distribution of an e-mail message sent by a sender or preparing an e-mail for preventing distribution of an e-mail message sent by a sender, in accordance with an embodiment of the invention. Turning to FIG. 9, numeral 900 outlines a method of preventing distribution of an e-mail message that is sent to one or more intended recipients. The method starts at step 902 with the sender opening in step 904 a new e-mail composition window in an e-mail application on the sender's e-mail client on which the non-distribution plug-in has been installed. Next, in step 906, the non-distribution option is selected on the sender e-mail client for the e-mail message. As discussed herein above with respect to FIGS. 2A and 2B, the sender can select a default option for the non-distribution plug-in, whereby the e-mail message is encrypted and the recipient is prevented from copying, forwarding, printing and saving the e-mail message received. For the flowchart, it is presumed that the sender has selected the default non-distribution option. Turning to step 908, an e-mail message is created or generated on the sender e-mail client, the e-mail message being addressed to one or more intended recipients. The e-mail message is sent in step 910 to one or more of the intended recipients specified in the e-mail message created. Once the sender sends the e-mail message, for instance, by clicking on a send button on the sender's e-mail client, the non-distribution plug-in installed on the sender's e-mail client is launched. In step 912, the non-distribution plug-in on the sender's e-mail client encrypts the sender's e-mail message that is to be sent to an intended or specified recipient. In particular, the non-distribution plug-in encrypt the sender's e-mail message using the public key corresponding to a respective recipient to whom the e-mail message is being sent and uses the secret non-distribution plug-in provided by the non-distribution plug-in. Further, in step 914, the non-distribution plug-in provides a hyperlink in the e-mail itself or alternatively in a transparent manner for downloading and installing the non-distribution plug-in on a recipient's e-mail client, based on the e-mail client that is being used by the recipient. The non-distribution plug-in sends the e-mail message in step 916 to each of the recipients specified in the e-mail message created. The e-mail message provides a hyperlink to the non-distribution plug-in, which is sent by a sender e-mail client and is received by a recipient e-mail client in step 918. The recipient's e-mail client displays in step 920 a non-distribution message or notification, which notifies the recipient that the non-distribution plug-in is required in order to view the message. The process on the recipient e-mail client is continued in step 1002 in the left side of the flowchart 1000 shown in FIG. 10. In particular, the non-distribution plug-in determines in step 1002 if the non-distribution plug-in is installed on recipient's e-mail client. If the non-distribution plug-in is installed on the recipient's e-mail client, the non-distribution plug-in determines in step 1006 if a correct version of the non-distribution plug-in is installed. If it is determined in step 1002 that the non-distribution plug-in is not installed or if it is determined that a correct version of the non-distribution plug-in is not installed in step 1006, the recipient is asked if the recipient would like to begin installation of the non-distribution plug-in in step 1008. If the recipient chooses not to install the non-distribution plug-in or the correct version of the non-distribution plug-in, then the process ends in step 1009 with the recipient being unable to read the sender's e-mail message. However, if the recipient chooses to install the non-distribution plug-in, then in step 1010 the non-distribution plug-in is installed (on a recipient e-mail client that does not have the non-distribution plug-in) or the correct version of the non-distribution plug-in is installed on a recipient e-mail client that has some version of the non-distribution plug-in. Further, in step 1012, the non-distribution plug-in decrypts the sender's e-mail message using the recipient's private key and the secret non-distribution plug-in key provided by the non-distribution plug-in. In step 1014, the non-distribution plug-in determines if the recipient wants to reply to the sender and if the recipient does not wish to reply to the sender, the process ends at 1015. However, if the recipient wishes to reply to the sender (by hitting the Reply or Reply All button), then the non-distribution plug-in removes in step 1016 the sender's e-mail message in the reply message. The recipient creates a reply message without the original sender' e-mail message and the reply message is sent to the sender and/or other recipients in step 1018, ending the process at step 1019.

As explained hereinabove, in an embodiment, a recipient cannot forward or print or copy the sender's e-mail message that is received given that the default option provided by the non-distribution plug-in disables these functions on a recipient's e-mail client. As such, the right hand side of FIG. 10 shows that if a recipient tries to forward the e-mail message received from the sender, for instance by clicking on the forward button provided by the recipient e-mail client, the non-distribution plug-in installed on a recipient e-mail client determines in step 1020 that the recipient is attempting to forward the e-mail message and as such, the non-distribution plug-in displays the non-distribution notification message in 1026 informing the recipient that the forward function has been disabled and that the e-mail message cannot be forwarded, ending the process at step 1027. Similarly, if the non-distribution plug-in determines in step 1022 that a recipient is trying to print an e-mail message, the non-distribution plug-in displays the non-distribution notification message in 1026 informing the recipient that the print function has been disabled and that the e-mail message cannot be printed, ending the process at step 1027. Further yet, if the non-distribution plug-in determines in step 1024 that a recipient is trying to copy an e-mail message, the non-distribution plug-in displays the non-distribution notification message in 1026 informing the recipient that the copy function has been disabled and that the e-mail message cannot be copied, thus, ending the process at step 1027. Further yet, if the non-distribution plug-in determines in step 1025 that a recipient is trying to save an e-mail message, the non-distribution plug-in displays the non-distribution notification message in 1026 informing the recipient that the save function has been disabled and that the e-mail message cannot be copied, thus, ending the process at step 1027. If the non-distribution plug-in determines that the recipient does not want to forward or copy or print or save the message, the process ends at step 1028. Although, FIG. 10 shows that the default setting of the non-distribution option has been chosen in the non-distribution plug-in, which has disabled each of the forward, print, copy and save functions provided by the recipient e-mail client, as discussed herein above, a sender could customize the non-distribution option provided in the non-distribution plug-in to disable only a subset of the forward, print, save and/or copy functions, such as, only the forward function, as discussed herein above with respect to FIG. 2B. Furthermore, the non-distribution plug-in could be customized to prevent distribution, such as, forward, copy and print for only part of an e-mail message, such as, only a sensitive paragraph in the e-mail message, as discussed herein above.

Figure 11:
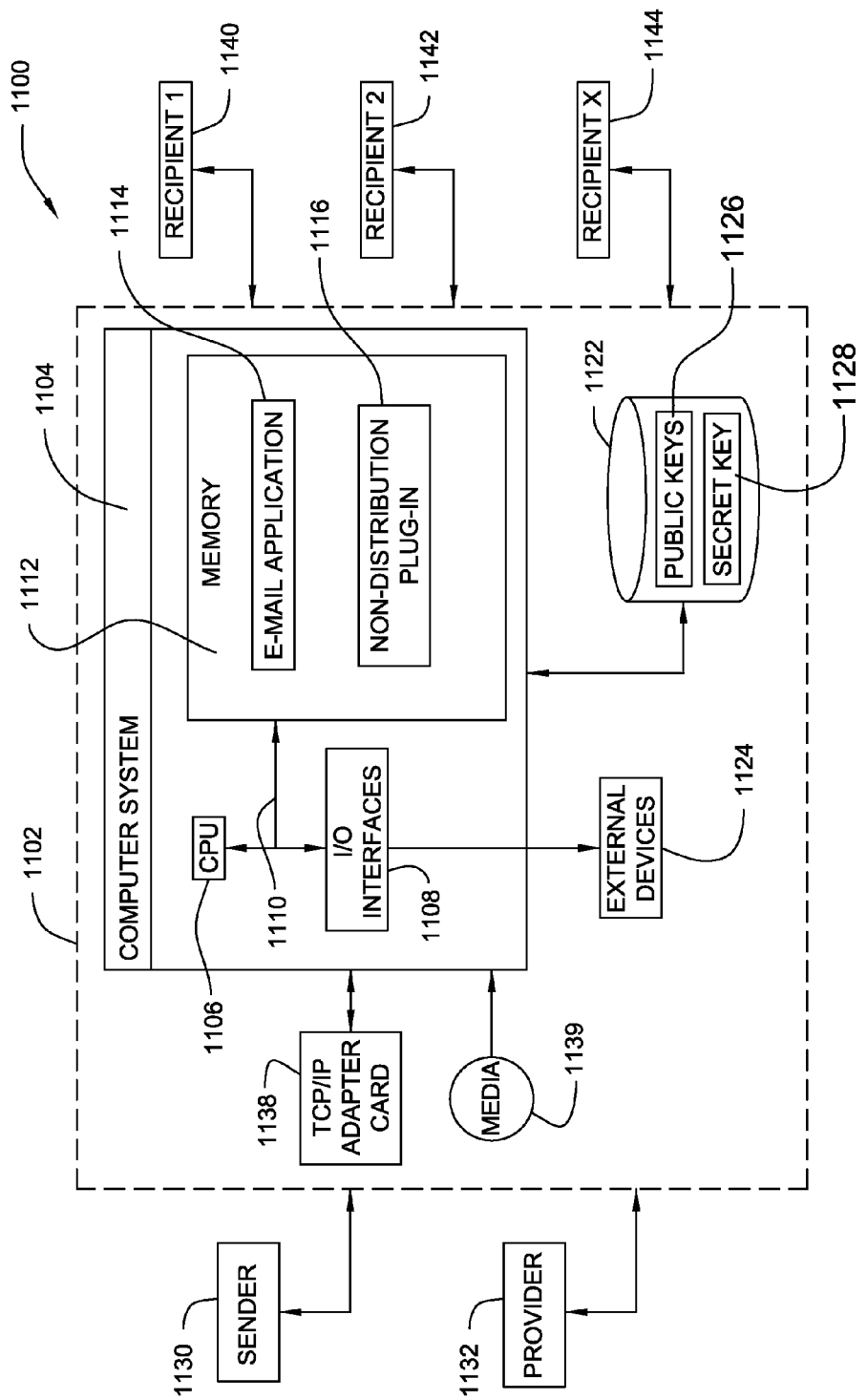
FIG. 11 is a schematic block system diagram illustrating a computer program product for preventing distribution of a sender's original e-mail message in an e-mail that is sent, in accordance with an embodiment of the present invention.

In yet another embodiment, the invention provides a computer program product for preventing distribution of a sender's e-mail message that is sent. The computer program product comprises a computer readable or computer-usable medium, which provides program code, namely, the non-distribution plug-in 1116 (in FIG. 11), for use by or in connection with a computer or any instruction execution system. The non-distribution plug-in or program code 1116 can be loaded into computer system 1104 from a computer readable media 1139, such as, a magnetic tape or disk, optical media, DVD, memory stick, semiconductor memory, etc. or downloaded from the Internet via a TCP/IP adapter card 1138. As depicted in FIG. 11, system 1100 includes a computer infrastructure 1102, which is intended to represent any type of computer architecture that is maintained in a secure environment (i.e., for which access control is enforced). As shown, infrastructure 1102 includes a computer system 1104 that typically represents an e-mail server or system 1104 or the like that includes a non-distribution plug-in or program code 1116 configured to prevent distribution of an e-mail message that is sent by a sender. It should be understood, however, that although not shown, other hardware and software components (e.g., additional computer systems, routers, firewalls, etc.) could be included in infrastructure 1102.

The computer program product further comprises first program instructions to create in an e-mail application on a sender e-mail client an e-mail message addressed to one or more intended recipients, the first program instructions including instructions to select a non-distribution option using a non-distribution plug-in installed on the sender e-mail client for preventing distribution of the e-mail message. Further, the computer program product comprises second program instructions to encrypt the e-mail message created by the sender using a respective public key corresponding to a respective recipient of the one or more intended recipients and to encrypt the e-mail message with a secret key provided by the non-distribution plug-in before sending the e-mail message to the respective recipient of the one or more intended recipients and third program instructions to decrypt the e-mail message on the respective recipient e-mail client using a respective private key corresponding to the respective recipient of the one or more intended recipients and to decrypt the e-mail message with the secret key provided by the non-distribution plug-in. Further, the computer program product comprises fourth program instructions to modify the respective recipient e-mail client corresponding to the respective recipient of the one or more intended recipients, wherein the non-distribution plug-in disables one or more functions provided by the respective recipient e-mail client and wherein the e-mail message sent by the sender is stripped in a reply message created in response to the e-mail message. In an embodiment, the first program instructions include instructions to configure the non-distribution plug-in installed on the sender e-mail client to learn storage locations of each respective private key of one or more private keys corresponding to one or more respective recipients and to learn storage locations of each respective public key of one or more public keys corresponding to the one or more respective recipients. In an embodiment, the second program instructions include instructions to send a hyperlink to a website for automatically downloading and installing a correct version of the non-distribution plug-in corresponding to the respective recipient e-mail client being used by the respective recipient of the one or more intended recipients. In an embodiment, the third program instructions include instructions to check if the correct version of the non-distribution plug-in is installed on the respective recipient e-mail client and, if not, to prompt the respective recipient to install the correct version of the non-distribution plug-in on the respective recipient e-mail client. In an embodiment, the fourth program instructions include instructions to store in a memory on the respective recipient e-mail client corresponding to the respective recipient of the one or more intended recipients, an encrypted version of the e-mail message sent by the sender and to issue a notification message to the respective recipient when the respective recipient attempts to utilize a function of the one or more functions disabled by the non-distribution plug-in. Preferably, each of the first, second, third and fourth program instructions are stored on the computer readable medium.

Referring to FIG. 11, there is illustrated a system 1100 for preventing distribution of a sender's e-mail message, according to the present invention. As depicted, system 1100 includes a computer infrastructure 1102, which is intended to represent any type of computer architecture that is maintained in a secure environment (i.e., for which access control is enforced). As shown, infrastructure 1102 includes a computer system 1104 that typically represents a server or the like. It should be understood, however, that although not shown, other hardware and software components (e.g., additional computer systems, routers, firewalls, etc.) could be included in infrastructure 1102.

In general, a sender of an e-mail (reference numeral 1130) interfaces with infrastructure 1102 to use a non-distribution option provided by a non-distribution plug-in 1116 installed or deployed on the computer system 1104 in order to prevent distribution of an e-mail message that is created and sent to one or more intended recipients. Similarly, one or more Recipients 1, 2 through X (designated by numerals 1140, 1142 through 1144) can interface with infrastructure 1102 for replying to a sender's e-mail message, when the sender has chosen the non-distribution option and, as such, a recipient wanting to decrypt and read the sender's e-mail message would have to access the non-distribution plug-in 1116. To this extent, infrastructure 1102 provides a secure environment. In general, the parties could access infrastructure 1102 directly, or over a network via interfaces (e.g., web browsers) loaded on computerized devices (e.g., personal computers, laptops, handheld devices, etc. not shown in FIG. 11). In the case of the latter, the network can be any type of network such as the Internet, a local area network (LAN), a wide area network (WAN), a virtual private network (VPN), etc. In any event, communication with infrastructure 1102 could occur via a direct hardwired connection (e.g., serial port), or via an addressable connection that may utilize any combination of wireline and/or wireless transmission methods. Moreover, conventional network connectivity, such as Token Ring, Ethernet, WiFi or other conventional communications standards could be used. Still yet, connectivity could be provided by conventional TCP/IP sockets-based protocol, for instance, using a TCP/IP adapter card 1138. In this instance, the parties could utilize an Internet service provider to establish connectivity to infrastructure 1102. It should be understood that under the present invention, infrastructure 1102 could be owned and/or operated by a party such as provider (reference numeral 1132), or by an independent entity. Regardless, use of infrastructure 1102 and the teachings described herein could be offered to the parties on a subscription or fee-basis. In either scenario, an administrator (not shown in FIG. 11) could support and configure infrastructure 1102.

Computer system 1104 is shown to include a CPU (hereinafter "processing unit 1106"), a memory 1112, a bus 1110 and input/output (I/O) interfaces 1108. Further, computer system 1100 is shown in communication with external I/O devices/resources 1124 and storage system 1122. In general, processing unit 1106 executes computer program code, such as the e-mail application 1114 and the non-distribution plug-in 1116, which is stored in memory 1112. Alternatively, the non-distribution plug-in 1116 could be stored in a storage system 1122. While executing computer program code, the processing unit 1106 can read and/or write data, to/from memory 1112, storage system 1122 and/or I/O interfaces 1108. For instance, in an embodiment, the non-distribution plug-in 1116 stores public keys 1126 corresponding to recipients 1 through X in storage system 1122. Furthermore, in an embodiment, the non-distribution plug-in 1116 stores the secret key 1128 used to encrypt and decrypt an e-mail message in storage system 1122. Bus 1110 provides a communication link between each of the components in computer system 1100. External devices 1124 can comprise any devices (e.g., keyboard, pointing device, display, etc.) that enable a user to interact with computer system 1100 and/or any devices (e.g., network card, modem, etc.) that enable computer system 1100 to communicate with one or more other computing devices.

Computer infrastructure 1102 is only illustrative of various types of computer infrastructures for implementing the invention. For example, in one embodiment, computer infrastructure 1102 comprises two or more computing devices (e.g., a server cluster) that communicate over a network to perform the various process steps of the invention. Moreover, computer system 1100 is only representative of various possible computer systems that can include numerous combinations of hardware. To this extent, in other embodiments, computer system 1100 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively. Moreover, processing unit 1106 may comprise a single processing unit, or be distributed across one or more processing units in one or more locations, e.g., on a client and server. Similarly, memory 1112 and/or storage system 1122 can comprise any combination of various types of data storage and/or transmission media that reside at one or more physical locations. Further, I/O interfaces 1108 can comprise any system for exchanging information with one or more external devices 1124. Still further, it is understood that one or more additional components (e.g., system software, math co-processing unit, etc.) not shown in FIG. 11 can be included in computer system 1100. However, if computer system 1100 comprises a handheld device or the like, it is understood that one or more external devices 1124 (e.g., a display) and/or storage system(s) 1122 could be contained within computer system 1100, not externally as shown.

Storage system 1122 can be any type of system (e.g., a database) capable of providing storage for information under the present invention. To this extent, storage system 1122 could include one or more storage devices, such as a magnetic disk drive or an optical disk drive. In another embodiment, storage system 1122 includes data distributed across, for example, a local area network (LAN), wide area network (WAN) or a storage area network (SAN) (not shown). Although not shown, additional components, such as cache memory, communication systems, system software, etc., may be incorporated into computer system 1100.

In another embodiment, the invention provides a process for deploying computing infrastructure comprising integrating computer-readable code into a computing system, wherein the code in combination with the computing system is capable of performing a process of preventing distribution of an e-mail message. The process comprises installing a non-distribution plug-in on a sender e-mail client for encrypting an e-mail message created by a sender sent to one or more intended recipients, generating an e-mail message to one or more intended recipients in an e-mail application on the sender e-mail client, selecting a non-distribution option provided by the non-distribution plug-in installed on the sender e-mail client for preventing distribution of the e-mail message generated, sending the e-mail message generated to the one or more intended recipients, wherein the e-mail message generated is encrypted using a respective public key corresponding to a respective recipient of the one or more intended recipients and a secret key provided by the non-distribution plug-in before being sent to the one or more intended recipients and providing a hyperlink to a website for installing a correct version of the non-distribution plug-in on a respective recipient e-mail client corresponding to each of the one or more intended recipients for displaying the e-mail message sent by the sender. The process further comprises checking, upon receipt by a respective recipient e-mail client corresponding to the respective recipient of the one or more intended recipients, whether a correct version of the non-distribution plug-in is installed on the respective recipient e-mail client corresponding to the respective recipient of the e-mail message, if the correct version of the non-distribution plug-in is not installed, prompting the respective recipient to install the correct version of the non-distribution plug-in on the respective recipient e-mail client and decrypting, upon checking that the correct version of the non-distribution plug-in is installed on the respective recipient e-mail client corresponding to a respective recipient, the e-mail message using a respective private key corresponding to the respective recipient and the secret key provided by the non-distribution plug-in. The process further comprises modifying the respective recipient e-mail client corresponding to the respective recipient of the e-mail message, wherein the non-distribution plug-in disables one or more functions provided by the respective recipient e-mail client and wherein the e-mail message sent by the sender is stripped when the respective recipient replies to the e-mail message. The method further comprises issuing a notification message to the respective recipient of the e-mail message when the respective recipient attempts to utilize a function of the one or more functions disabled by the non-distribution plug-in, wherein the function comprises at least one of copying the e-mail message, printing the e-mail message, forwarding the e-mail message, saving the e-mail message or replying to the e-mail message.

Accordingly, any of the components of the present invention as shown in FIG. 10 can be deployed, managed, serviced by a service provider who offers to prevent distribution of an e-mail message that is sent. Preferably, the invention provides a business method that performs the process steps of the invention on a subscription, advertising and/or fee basis. In particular, a service provider, such as a solution integrator could offer to prevent distribution of an e-mail message that is sent. In this case, the service provider can, for instance, create, maintain and support a computer infrastructure that performs the process steps of the invention for one or more customers. In return, the service provider can receive payment from the customer or customers under a subscription and/or fee agreement and/or the service provider can receive payment from the sale or advertising of content to one or more third parties.

The foregoing descriptions of specific embodiments of the present invention have been presented for the purpose of illustration and description. They are not intended to be exhaustive or to limit the invention to the precise forms disclosed and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method of preventing distribution of an e-mail message, said method comprising the steps of:
   generating an e-mail message to one or more intended recipients using an e-mail application installed on a sender e-mail client;
   selecting a non-distribution option provided by a non-distribution plug-in installed on said sender e-mail client;

sending said e-mail message generated to said one or more intended recipients, wherein said e-mail message generated is encrypted using a secret key provided by said non-distribution plug-in and a respective public key corresponding to a respective recipient of said one or more intended recipients before being sent to said one or more intended recipients;

identifying a correct version of said non-distribution plug-in compatible with a respective recipient e-mail client corresponding to each of said one or more intended recipients;

providing a hyperlink to a website for installing said correct version of said non-distribution plug-in on a respective recipient e-mail client corresponding to each of said one or more intended recipients for decrypting and displaying said e-mail message sent by said sender;

decrypting said e-mail message; and modifying said respective recipient e-mail client corresponding to said respective recipient of said e-mail message in response to said non-distribution option selected via said non-distribution plug-in installed on said sender e-mail client, wherein said non-distribution plug-in disables one or more functions that allow distribution of said e-mail message provided by said respective recipient e-mail client.

2. The method according to claim 1, further comprising the steps of:

checking whether a correct version of said non-distribution plug-in is installed on said respective recipient e-mail client corresponding to said respective recipient of said e-mail message;

if said correct version of said non-distribution plug-in is not installed, prompting said respective recipient to install said correct version of said non-distribution plug-in on said respective recipient e-mail client; and decrypting, upon checking that said correct version of said non-distribution plug-in is installed on said respective recipient e-mail client corresponding to said respective recipient, said e-mail message using a respective private key corresponding to said respective recipient and using said secret key provided by said non-distribution plug-in.

3. The method according to claim 2, further comprising the step of:

modifying said respective recipient e-mail client corresponding to said respective recipient of said e-mail message received, wherein said e-mail message sent by said sender has an original content of said e-mail message automatically removed when said respective recipient replies to said e-mail message such that said respective recipient of said e-mail message is prevented from distributing the original content of said e-mail message.

4. The method according to claim 3, further comprising the step of:

issuing a notification message to a recipient of said one or more intended recipients of said e-mail message when said recipient attempts to utilize a function of said one or more functions disabled by said non-distribution plug-in, wherein said function comprises at least one of: copying said e-mail message, printing said e-mail message, forwarding said e-mail message, saving said e-mail message and replying to said e-mail message.

5. A method of preparing an e-mail for preventing distribution of an e-mail message contained therein, said method comprising the steps of:

installing a non-distribution plug-in on a sender e-mail client for encrypting an e-mail message created by a sender sent to one or more intended recipients;

creating, using a sender e-mail client installed on a computing system, an e-mail message to one or more intended recipients in an e-mail application;

selecting a non-distribution option for preventing distribution of said e-mail message created;

encrypting said e-mail message created, using a secret key provided by said non-distribution plug-in installed on said sender e-mail client;

transmitting said e-mail message encrypted by said non-distribution plug-in to said one or more intended recipients;

identifying a correct version of said non-distribution plug-in compatible with a respective recipient e-mail client corresponding to each of said one or more intended recipients;

decrypting on a respective recipient e-mail client corresponding to a respective recipient of said one or more intended recipients said e-mail message received using said secret key provided by said non-distribution plug-in for displaying said e-mail message on said respective recipient e-mail client; and removing an original content of said e-mail message decrypted in a reply e-mail message generated in response to said e-mail message received, wherein said respective recipient of said one or more intended recipients is prevented from distributing the original content of said e-mail message received by said selection of said non-distribution option on said non-distribution plug-in installed on said sender e-mail client.

6. A method according to claim 5, wherein said selecting step further comprises the step of:

selecting said non-distribution option for preventing one or more actions from being performed with respect to said e-mail message transmitted to said respective recipient e-mail client corresponding to said one or more intended recipients; wherein said one or more actions comprises at least one of: copying said e-mail message, printing said e-mail message, forwarding said e-mail message, saving said e-mail message and replying to said e-mail message.

7. A method according to claim 6, wherein said encrypting step further comprises the step of:

encrypting said e-mail message of sender, using a respective public key corresponding to said respective recipient of said one or more intended recipients before transmitting said e-mail message encrypted to said respective recipient of said one or more intended recipients.

8. A method according to claim 7, wherein said transmitting step further comprises the step of:

sending a hyperlink to a web site for enabling the installation of said correct version of said non-distribution plug-in based on said respective recipient e-mail client being used by said respective recipient of said e-mail message transmitted.

9. A method according to claim 8, wherein said decrypting step further comprises the step of:

decrypting said e-mail message created using a respective private key corresponding to said respective recipient of said one or more intended recipients in addition to said secret key provided by said non-distribution plug-in.

10. A method according to claim 9, wherein said decrypting step further comprises the steps of:

checking whether said correct version of said non-distribution plug-in is installed on said respective recipient e-mail client corresponding to said respective recipient of said e-mail message transmitted; and if not, prompting said respective recipient to install said correct version of said non-distribution plug-in on said respective recipient e-mail client.

11. A method according to claim 10, wherein said decrypting step further comprises the step of:

storing only an encrypted version of said e-mail message in a memory on said respective recipient e-mail client.

12. A method according to claim 11, further comprising the step of:

issuing a notification message to a recipient of said e-mail message when said recipient attempts an action of said one or more actions prevented by said non-distribution plug-in; wherein said action comprising at least one of: copying said e-mail message, printing said e-mail message, forwarding said e-mail message, saving said e-mail message and replying to said e-mail message.

13. A computer program product for preventing distribution of an e-mail message, said computer program product comprising:

a non-transitory computer readable medium;

first program instructions to create in an e-mail application on a sender e-mail client an e-mail message addressed to one or more intended recipients, said first program instructions including instructions to select a non-distribution option using a non-distribution plug-in installed on said sender e-mail client for preventing distribution of said e-mail message;

second program instructions to encrypt said e-mail message created by said sender using a respective public key corresponding to a respective recipient of said one or more intended recipients and to encrypt said e-mail message with a secret key provided by said non-distribution plug-in before sending said e-mail message to said respective recipient of said one or more intended recipients;

third program instructions to decrypt said e-mail message on said respective recipient e-mail client using a respective private key corresponding to said respective recipient of said one or more intended recipients and to decrypt said e-mail message with said secret key provided by said non-distribution plug-in, wherein said third program instructions include instructions to identify a correct version of said non-distribution plug-in compatible with a respective recipient e-mail client corresponding to each of said one or more intended recipients; and fourth program instructions to modify said respective recipient e-mail client corresponding to said respective recipient of said one or more intended recipients; wherein said non-distribution plug-in disables one or more functions that allow distribution of said e-mail message provided by said respective recipient e-mail client in response to said non-distribution option selected via said non-distribution plug-in installed on said sender e-mail client; and wherein said e-mail message sent by said sender has an original content of said e-mail message automatically removed in a reply message created in response to said e-mail message such that said respective recipient of said one or more intended recipients is prevented from distributing the original content of said e-mail message received, and wherein said first, second, third, and fourth program instructions are recorded on said non-transitory computer readable medium.

14. A computer program product according to claim 13, wherein said first program instructions include instructions to configure said non-distribution plug-in installed on said sender e-mail client to learn storage locations of each respective private key of one or more private keys corresponding to one or more respective recipients and to learn storage locations of each respective public key of one or more public keys corresponding to said one or more respective recipients.

15. A computer program product according to claim 14, wherein said second program instructions include instructions to send a hyperlink to a website for automatically downloading and installing said correct version of said non-distribution plug-in corresponding to said respective recipient e-mail client being used by said respective recipient of said one or more intended recipients.

16. A computer program product according to claim 15, wherein said third program instructions include instructions to check if said correct version of said non-distribution plug-in is installed on said respective recipient e-mail client and, if not, to prompt said respective recipient to install said correct version of said non-distribution plug-in on said respective recipient e-mail client.

17. A computer program product according to claim 16, wherein said fourth program instructions include instructions to store in a memory on said respective recipient e-mail client corresponding to said respective recipient of said one or more intended recipients, an encrypted version of said e-mail message sent by said sender and to issue a notification message to said respective recipient when said respective recipient attempts to utilize a function of said one or more functions disabled by said non-distribution plug-in.

18. A process for deploying computing infrastructure comprising integrating computer-readable code into a computing system, wherein said code in combination with said computing system is capable of performing a process of preventing distribution of an e-mail message sent, said process comprising:

installing a non-distribution plug-in on a sender e-mail client for encrypting an e-mail message created by a sender sent to one or more intended recipients;

generating an e-mail message to one or more intended recipients in an e-mail application on said sender e-mail client;

selecting a non-distribution option provided by said non-distribution plug-in installed on said sender e-mail client for preventing distribution of said e-mail message generated;

sending said e-mail message generated to said one or more intended recipients, wherein said e-mail message generated is encrypted using a respective public key corresponding to a respective recipient of said one or more intended recipients and a secret key provided by said non-distribution plug-in before being sent to said one or more intended recipients;

identifying a correct version of said non-distribution plug-in compatible with a respective recipient e-mail client corresponding to each of said one or more intended recipients;

providing a hyperlink to a website for installing said correct version of said non-distribution plug-in on a respective recipient e-mail client corresponding to each of said one or more intended recipients for displaying said e-mail message sent by said sender;

decrypting said e-mail message using a respective private key corresponding to said respective recipient and said secret key provided by said non-distribution plug-in; and modifying said respective recipient e-mail client corresponding to said respective recipient of said e-mail message in response to said non-distribution option selected via said non-distribution plug-in installed on said sender e-mail client, wherein said non-distribution plug-in disables one or more functions that allow distribution of said e-mail message provided by said respective recipient e-mail client; and wherein said e-mail message sent by said sender has an original content of said e-mail message automatically removed when said respective recipient replies to said e-mail message such that said respective recipient of said one or more intended recipients is prevented from distributing the original content of said e-mail message received.

19. The process according to claim 18, further comprising the steps of:

checking, upon receipt by a respective recipient e-mail client corresponding to said respective recipient of said one or more intended recipients, whether said correct version of said non-distribution plug-in is installed on said respective recipient e-mail client corresponding to said respective recipient of said e-mail message; and if said correct version of said non-distribution plug-in is not installed, prompting said respective recipient to install said correct version of said non-distribution plug-in on said respective recipient e-mail client.

20. The process according to claim 19, further comprising the step of:

issuing a notification message to said respective recipient of said e-mail message when said respective recipient attempts to utilize a function of said one or more functions disabled by said non-distribution plug-in; wherein said function comprises at least one of: copying said e-mail message, printing said e-mail message, forwarding said e-mail message, saving said e-mail message and replying to said e-mail message.

* * * * *